(12) United States Patent
Kawaguchi et al.

(10) Patent No.: US 6,936,783 B2
(45) Date of Patent: Aug. 30, 2005

(54) PUSH-BUTTON SWITCH MEMBER AND MANUFACTURING METHOD OF SAME

(75) Inventors: Toshiyuki Kawaguchi, Saitama (JP); Shinji Hotta, Kodama-gun (JP); Masayuki Takahashi, Saitama (JP)

(73) Assignee: Shin-Etsu Polymer Co., Ltd., Tokyo (JP)

(*) Notice: Subject to any disclaimer, the term of this patent is extended or adjusted under 35 U.S.C. 154(b) by 23 days.

(21) Appl. No.: 10/603,762

(22) Filed: Jun. 26, 2003

(65) Prior Publication Data

US 2004/0129542 A1 Jul. 8, 2004

Related U.S. Application Data

(63) Continuation-in-part of application No. PCT/JP02/04028, filed on Apr. 23, 2002.

(30) Foreign Application Priority Data

May 25, 2001 (JP) ........................................ 2001-156730

(51) Int. Cl.$^7$ ............................................... H01H 13/70
(52) U.S. Cl. ...................... 200/514; 200/5 A; 200/314; 200/317
(58) Field of Search ................................ 200/314, 5 A, 200/514, 512–517, 310–317, 5 R; 362/23, 29, 84

(56) References Cited

U.S. PATENT DOCUMENTS

| | | | |
|---|---|---|---|
| 4,293,764 A | | 10/1981 | Amrhein |
| 5,871,088 A | * | 2/1999 | Tanabe ........................ 200/514 |
| 6,416,196 B1 | * | 7/2002 | Lemarchand et al. ....... 200/314 |
| 6,595,653 B2 | * | 7/2003 | Saito et al. .................. 200/314 |
| 2002/0021086 A1 | | 2/2002 | Czak |

FOREIGN PATENT DOCUMENTS

| | | | |
|---|---|---|---|
| EP | 0981144 A1 * | 2/2000 | .......... H01H/13/02 |
| JP | 62-277468 | 12/1987 | |
| JP | 10-007795 | 1/1998 | |
| JP | 10-249881 | 9/1998 | |
| JP | 10-289632 | 10/1998 | |
| JP | 2000-067682 | 3/2000 | |
| JP | 2000-285760 | 10/2000 | |
| JP | 2000-306457 | 11/2000 | |
| JP | 2001-023775 | 1/2001 | |
| JP | 2001-052874 | 2/2001 | |
| JP | 2001-143560 | 5/2001 | |
| JP | 2001-176675 | 6/2001 | |
| JP | 2001-522512 | 11/2001 | |
| WO | 96/30919 | 10/1996 | |

* cited by examiner

Primary Examiner—Elvin Enad
Assistant Examiner—M. Fishman
(74) Attorney, Agent, or Firm—Wenderoth, Lind & Ponack, L.L.P.

(57) ABSTRACT

A push-button switch member which utilizes light energy without any loss for back-lighting on a display section and which realizes the back-lightening to the display section with an even luminance while suppressing power consumption and having high visibility and thin thickness. The push-button switch member includes a key-top portion and a cover base member which is provided at a predetermined portion of the key-top portion and which is adapted to be mounted to the circuit board. The key-top portion includes a display section for displaying a switching function and an area emitter which is integrally formed with the display section. The area emitter member is provided with a light emitting layer disposed between a base electrode and a transparent electrode, which is disposed so as to oppose the base electrode. The transparent electrode is arranged to be contacted to the display section and is formed of a transparent conductive polymer.

27 Claims, 11 Drawing Sheets

PUSH-BUTTON SWITCH MEMBER AND MANUFACTURING METHOD OF SAME

This application is a Rule 1.53(b) Continuation-In-Part of International Application No. PCT/JP02/04028, with an international filing date of Apr. 23, 2002.

FIELD OF THE INVENTION

The present invention relates to a member for constituting or forming a push-button switch (hereinafter referred to as a "push-button switch member") and a method of manufacturing such a push-button switch member in which the push-button switch member is provided with a display section for displaying a switching function in an input device such as a cellular phone (portable phone), a portable terminal such as a PDA (Personal Digital Assistant), a car-stereo, a board computer which is mounted to a vehicle, an audio-set, a measurement instrument, a personal computer, etc., and more particularly, to the push-button switch of a back-light type switch which is capable of lighting up the display section even in a dark place.

BACKGROUND TECHNOLOGY

In the prior art, for a member for a push-button switch which is utilized for the input device of the type as mentioned above, it is said to be necessary to have a letter back-lighting function for back-lighting a display section which shows a push-button switching function during the nighttime.

For example, with reference to FIG. 18 or 19, which illustrate a sectional view of a member for a push-button switch 30 which is utilized for an input device of a cellular phone, the push-button switch 30 comprises a cover base member 32 having a plurality of key top portions 31 each constituting an operation key, and a circuit board (substrate) 33 which is disposed so as to oppose the cover base member 32. The cover base member 32 and the circuit board 33 are assembled, in the opposing state, in a housing of an input device as an object device so as to achieve a switching function. Furthermore, in order to clearly describe the function of the push-button switch 30 even in a dark place, top surface portions or rear surface portions of the respective key top portions 31, each constituting the operation key, are provided with display sections 34 to which letters, symbols, figures or like are described (formed) so that a direct light from a light source such as an LED 35 or an electric bulb 36 which is disposed on the circuit board 33, or a reflected light that is generated by reflecting such a direct light to peripheral members or the like is transmitted from the rear surface portion of the key top portion 31 to the top surface portion thereof to thereby visually recognize a content that is displayed on the display section 34 in the light-up manner. Accordingly, even in the night time, the cellular phone or the like can be used without any problem.

Furthermore, in a case where even more brightness is needed, as shown in FIG. 20 or 21, it has been attempted to enlarge a luminescent surface area by inserting a light guide member 37 of a thin plate shape between the LED 35 and the key top portion 31 or by using an EL (electro-luminescence) sheet 38 which performs surface-luminescence (emission) as a light source.

However, the light source such as the LED 35, the electric bulb 36 and the EL sheet 38 and the light guide member 37 which guides the direct light from the light source are arranged in portions that are apart from the key top portions 31 so as to not obstruct a contacting function of contact portions 39 on the circuit board 33 to the key top portions 31. Accordingly, it is necessary for the light sources 35, 36 and 38 and the light guide member 37 to take a positional relationship that is apart from the display sections 34, and in order to obviate such a defect, the LED 35, the number of the electric bulbs 36 and the light guide members 37 to be arranged are increased, and expensive EL sheets 38 are used. In such a case, a design of a push-button switch is made more difficult because of the increased number of parts or elements to be arranged, and in an adverse case, a sufficient light amount nevertheless cannot be ensured for recognizing the displayed contents on the display sections 34 in a dark place, and thus, such a design is not practical.

Especially, in general, for the cellular phone that is operated by a cell, which requires a small power consumption, it is also required to ensure a sufficient amount of light with a reduced number of light sources. However, in the conventional method as described above, the mere portion of the light that is generated from the light source can be increased or added to so as to visually recognize the display section 34, and even with a large power consumption, the ability of the visual recognition could not be improved, thus being conflictive.

In addition, it is difficult to make the thickness of the push-button switch 30 thinner because the light sources 35, 36, 38 and the light guide members 37 are disposed between the key top portions 31 and the contact portions 39 which are arranged on the circuit board 33 so as to oppose the key top portions 31, which results in a restriction on the ability to make the thickness of the input device or machinery body thinner in addition to resulting in increase in weight.

In order to obviate such defects, there is a known prior art technology such as that which is disclosed in Japanese Patent Laid-open (KOKAI) Publication No. 232954/1999 or No. 285760/2000, in which it is attempted to prevent the light dispersion and the light quantity loss due to the location of an obstacle by attaching a light source to a portion near a display section with an area (plane or flat) emitter spontaneously emitting a light to a top surface portion of the key top portion.

Such an area emitter is one which is formed by forming a transparent conductive layer on a transparent insulating film through ion-spattering of ceramic such as tin oxide, tin indium oxide, antimony tin oxide or the like, or one which is formed by forming a transparent conductive ink on the transparent insulating film through a screen printing method in which a ceramic powder is dispersed in and mixed with a transparent insulating resin.

However, in the method in which the transparent conductive layer is formed with the ceramic layer by utilizing the ion spattering method using tin oxide or the like, the ceramic layer is itself brittle and is not almost extendable, and as a result, even if a transparent insulating film is elongated so as to have a desired key top shape, the transparent conductive layer does not follow such shape and a resistance rapidly increases, thus being inconvenient.

Furthermore, in the prior art method in which the transparent conductive layer is formed through the printing method using the transparent conductive ink that is formed by adding the ceramic powder into the transparent insulating resin and then mixing the ceramic powder with the transparent insulating resin, the conductivity is maintained by the linkage of the powder. However, in this method, the resistance is not reduced so remarkably even with a significant amount of ceramic powder content, and further, it is difficult to uniformly disperse the ceramic powder. Accordingly, at a time when it is desired to elongate the transparent insulating film so as to deform the transparent insulating film as a base material to provide a desired shape, the linkage of the ceramic powder of the transparent conductive layer is easily destroyed, thereby resulting in an increase of resistance which, in turn, causes uneven luminance.

Accordingly, the present invention has been conceived to solve the above-described problems which are attributed to a member for a push-button switch back-lighting a display section of a key-top portion of a conventional structure. An object of the present invention is therefore to provide a member for constituting a push-button switch having a thin thickness and a high visual recognition performance which is capable of realizing back-lighting of a display section having high light emission efficiency with a reduced consumption of electric power and a less uneven luminance by using the back-lighting of the display section without any loss of light energy.

SUMMARY OF THE INVENTION

A first aspect of the present invention is, in order to solve the above-described problems, a push-button switch member which comprises a key-top portion for pressing a movable contact point that is disposed so as to oppose a stationary contact point on a circuit board against the stationary contact point, and a cover base member which is provided with the key top portion at a predetermined portion of the key top portion and which is mounted to the circuit board. The key-top portion is provided with a display section for displaying a switching function, and a area emitter member which is integrally formed with the display section. The area emitter member is provided with a light emitting layer that is disposed between a base electrode and a transparent electrode disposed so as to oppose the base electrode, and the transparent electrode is arranged to be contacted to the display section and made from a transparent conductive polymer.

According to the first aspect of the present invention, since the display section itself emits a light, the visibility of the key-top portion can be remarkably improved.

In addition, since the light emitting layer of the area emitting member is used only for the key-top portion, the manufacturing cost can be reduced, and the power consumption for back-lighting can be also reduced. Furthermore, it is not necessary to dispose a light source or a light guide member between the key-top portion and the contact point that is formed to the circuit board so as to correspond to the key-top portions, and thus, the push-button switch member can be provided with a thin thickness. Therefore, an input device or machinery that is incorporated with such a push-button switch member can be made to be thin.

A second aspect of the present invention is, in addition to the structure of the first aspect, characterized in that the transparent electrode has a surface resistance of not less than 10 Ω/□ and a light permeability of not more than 90%.

According to the second aspect of the present invention, the power consumption can be reduced while keeping the transparency and the extendability.

A third aspect of the present invention is, in addition to the structure of the first or second aspects, characterized in that the transparent electrode comprises an electro-conductive fiber having a diameter of not more than 0.5 μm and an aspect ratio of not less than 20.

According to the third aspect of the present invention, even in the case where the tensile force due to the drawing process is applied, the transparency and the conductivity can be maintained, and thus, the reliability of the switching function can be further secured, in addition to the effects of the first and second aspects.

A fourth aspect of the present invention is, in addition to the structure of any one of the first to third aspects, characterized in that the transparent electrode is colored.

According to the fourth aspect of the present invention, the number of elements constituting the elements of the display section can be reduced, and thus, the manufacturing cost can be further reduced.

A fifth aspect of the present invention is, in addition to the structure of any one of the first to fourth aspects, characterized in that the transparent conductive polymer is composed of one of the derivatives selected from the group consisting of polypyrrole, polythiophen and polyaniline.

The transparent conductive polymer material has a strong resistance to oxygen and humidity, and a good transparency and conductivity, and thus, the visibility of the key-top portion and the reliability of the switching function can be further improved.

A sixth aspect of the present invention is, in addition to the structure of any one of the first to fifth aspects, characterized in that elongatable (extendable) conductive members are connected to the base electrode and the transparent electrode, respectively, and the conductive member, having an extendable portion to which a tensile force is applied at a molding time is covered with an extendable insulating thin film.

According to the sixth aspect of the present invention, the insulating thin film limits the flow of the material of the conductive member extending from the base electrode, whereby an increase in the resistance of the base electrode can be suppressed and the display section emitting an even amount of light can be provided. In addition, since the small light emitting layer can be disposed near the display section, the good visibility in design is obtainable even with a small consumption power. Furthermore, since another additional part or member is not required, the push-button switch member having a thinner thickness, a smaller size and a more economical merit can be realized.

A seventh aspect of the present invention is, in addition to the structure of the sixth aspect, characterized in that the conductive members connected respectively to the base electrode and the transparent electrode are arranged so as to not be overlapped with each other.

According to the seventh aspect of the present invention, damage is not caused by contacting of the base electrode with the transparent electrode at the time of the molding process and in use of a completed product after the molding, thereby achieving stable back-lighting.

An eighth aspect of the present invention is, in addition to the structure of the sixth or seventh aspects, characterized in that the insulating thin film has a storage modulus, at a molding temperature thereof, which is larger than a storage modulus of the conductive members which are connected to the base electrode and the transparent electrode at the molding temperature thereof.

According to the eighth aspect of the present invention, at the time of forming the shape of the key-top portion, the moldability can be improved.

A ninth aspect of the present invention is, in addition to the structure of any one of the sixth to eighth aspects, characterized in that the base electrode and the conductive member which are connected to the base electrode are composed of a conductive layer containing organic polymer and a conductive filler, where the filler has at least one side length having not more than ⅓ of the thickness of the conductive layer.

According to the ninth aspect of the present invention invention, since the interlocking of the conductive fillers can be maintained after the molding, the conductivity can be further ensured.

A tenth aspect of the present invention is, in addition to the structure of the ninth aspect, characterized in that a conductive polymer layer is further added to the conductive layer.

According to the tenth aspect of the present invention, the conductivity can be further ensured.

An eleventh aspect of the present invention is, in addition to the structure of the ninth or tenth aspects, characterized in that the conductive filler is composed of a fiber material having a diameter of not more than 1 μm.

According to the eleventh aspect of the present invention, since the conductive filler can be easily orientated at the molding time, and even if an excessive elongation more than 200% is applied, the required conductivity can be maintained.

A twelfth aspect of the present invention is, in addition to the structure of any one of the sixth to eleventh aspects, characterized in that the base electrode and the conductive member connected to the base electrode are formed of conductive polymer.

According to the twelfth aspect of the present invention, the excessive increase of the resistance due to the elongation is hardly caused and the molding yield will be readily stabilized.

A thirteenth aspect of the present invention is, in addition to the structure of any one of the first to twelfth aspects, characterized in that the key-top portion includes key-top body in the shape of a key-top formed to a rear surface of the base electrode, and a push projection is formed to the rear surface of the key-top body for contacting the movable electrode to the stationary electrode.

According to the thirteenth aspect of the present invention, the push projection makes the movable contact point so as to surely contact the stationary contact point, and therefore, the reliability of the switching function can be enhanced.

A fourteenth aspect of the present invention is, in addition to the structure of any one of the first to twelfth aspects, characterized in that the key-top portion has a transparent first resin molded form having a key-top shape to the surface of the transparent electrode through a transparent insulating film, and a second resin molded form that is formed with a push projection to the rear surface of the base electrode for contacting the movable electrode to the stationary electrode.

According to the fourteenth aspect of the present invention, the push projection makes the movable contact point so as to surely contact the stationary contact point, and therefore, the reliability of the switching function can be enhanced.

A fifteenth aspect of the present invention is, in addition to the structure of any one of the first to twelfth aspects, characterized in that a plurality of switch circuits which are composed of a plurality of key-top portions and base electrodes, and a plurality of transparent electrodes corresponding to the plurality of key-top portions, respectively, are integrally formed to the cover base member.

According to the fifteenth aspect of the present invention, since a plurality of key-top portions can be highly backlighted evenly, when it is applied to an electric or an electronic element or equipment requiring a plurality of key-top portions such as cellular phone, the design and usability can be improved.

A sixteenth aspect of the present invention is a production method of the push-button switch member recited in any one of the first to fifteenth aspects. The production method is characterized in that, at a time when a transparent insulating film having one surface on which the transparent electrode is formed is subjected to a drawing process so as to be formed in a predetermined key-top shape, the transparent electrode of the elongating portion at which a tensile force is applied at the drawing process is formed from elongatable conductive polymer.

According to the sixteenth aspect of the present invention, any conductive defect due to the molding working is not caused, and therefore, no defect at the side surface portion of the key-top portion due to the conductive defect is caused, thereby improving the manufacturing efficiency.

A seventeenth aspect of the present invention is, in addition to the production method of the sixteenth aspect, characterized in that at least the elongating portion of the transparent electrode before the drawing process is thickened.

According to the seventeenth aspect of the present invention, since the conductivity at the elongating portion of the transparent electrode due to the molding working can be maintained, the conductive defect at the bent portion of the transparent electrode can be eliminated, thereby improving the manufacturing efficiency.

An eighteenth aspect of the present invention is a production method of the push-button switch member recited in any one of the sixth to fifteenth aspects. The production method of the eighteenth aspect is characterized by comprising the steps of: forming a transparent electrode at a portion corresponding to a key-top portion which is formed to one surface of a transparent insulating film covering an outer surface of the key-top portion; forming a light emitting layer on the transparent electrode; forming a base electrode on the light emitting layer; preparing a printed sheet before a drawing process for forming elongatable conductive members which are connected to the base electrode and the transparent electrode; and drawing the printed sheet so as to form a predetermined key top shape, wherein the elongating portion constituting a portion of the conductive member to which a tensile force is applied at the drawing process is covered with an elongatable insulating thin film.

According to the eighteenth aspect of the present invention, the insulating thin film limits the flow of material of the conductive member extending from the base electrode, and therefore, the increase of the resistance of the base electrode can be suppressed and the display section emitting even light can be provided. In addition, since the small light emitting layer can be disposed near the display section, the good visibility in design is obtainable even with a small power consumption. Furthermore, since another extra part or member is not required, a manufacturing method of the push-button switch member having a thinner thickness, a smaller size and a more economical merit can be realized.

DETAILED DESCRIPTION OF THE INVENTION

Respective embodiments according to the present invention will be described below with reference to the accompanying drawings.

First Embodiment of the Present Invention

Figure 1:
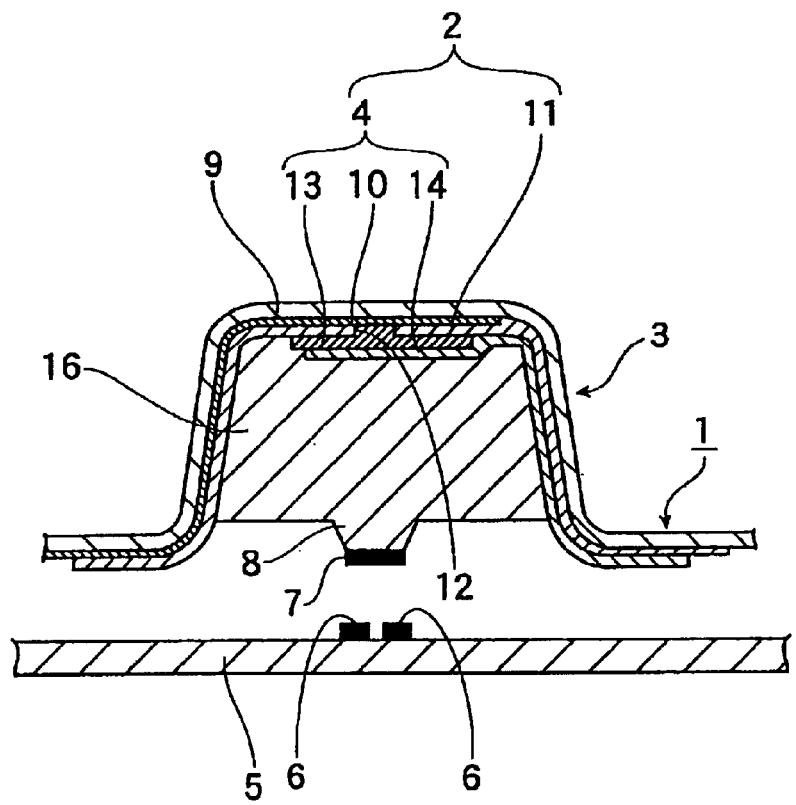
FIG. 1 is a sectional view showing an essential portion of a member for a push-button switch according to a first embodiment of the present invention.

FIG. 1 is a sectional view showing an essential portion of a member for a push-button switch according to a first embodiment of the present invention.

A member 1 for constituting or forming a push-button switch (hereinafter referred to as a "push-button switch member") according to the first embodiment shown in FIG. 1 is provided with a key-top portion 3 and a display section 2 which displays switching functions by means of letters, symbols, figures or like. The display section 2 is provided on a top (front) surface side of the key-top portion 3 and utilizes an area (plane or flat) emitter 4 for spontaneously emitting a light.

The push-button switch member 1 according to the first embodiment is provided with a movable contact point 7 which is disposed so as to oppose a stationary contact point 6 that is formed on a circuit board 5. In more detail, the movable contact point 7 is formed at a front end of a push projection 8 that is formed at a central portion of a rear surface side of the key-top portion 3. When the key-top portion 3 is pushed toward the circuit board 5, the movable contact point 7 contacts the stationary contact point 6.

Furthermore, a cover base member (not shown) which is formed of an elastic material such as silicone rubber is disposed between the push-button switch member 1 and the circuit board 5 so as to cover an outer periphery of a plurality of key-top portions 3 which are disposed at predetermined positions. When the key-top portion 3 is depressed, a portion of the cover base member is elastically deformed towards the circuit board 5 side. On the other hand, when a hand (finger) of an operator is released from the key-top portion 3, the cover base member is returned to its original position due to an elastic restoring force of the cover base member.

The key-top portion 3 has a key-top body 16 which determines a substantial shape of the key-top portion 3. A material for the key-top body 16 is selected from hard or soft resin or elastomer, or the like material. Thermoplastic or thermosetting material is also usable, and a shape thereof is not limited to a shape such as a film shape, a pellet shape or a liquid state. However, it may be desired to use a liquid-state thermosetting resin because the liquid-state thermoplastic resin is easily injected.

An outer peripheral portion of the key top portion 3 except for the rear surface portion thereof, is covered with a transparent insulating film 9, and at a rear (bottom) surface of the transparent insulating film 9, there is formed a transparent electrode 10 constituting one electrode of the area emitter 4 in a range between the side surface of the key-top portion 3 and the top surface portion of the key-top portion 3 thereof. On the other hand, at the bottom surface of the transparent electrode 10 and at a bottom surface portion of the transparent insulating film 9 at which the transparent electrode 10 is not formed, there is formed an opaque color layer 11 having a light-shielding property and an insulation property. This opaque color layer 11 is formed with a punched-out portion or section 12 in conformity with the letter, symbol or figure to be formed to the display section 2. The opaque color layer 11 has a bottom surface to which a light emitting layer 13 is formed so as to have a size that is slightly smaller than the top surface portion of the key-top portion 3 including the punched-out portion 12. Accordingly, the punched-out portion 12 is embedded with the light emitting layer 13 to thereby form a pattern section consisting of the letter, symbol or figure, and a design of the display section 2 is completed by this pattern section and a base that is composed of a peripheral opaque color layer 11 of the punched-out portion 12. A base electrode 14 forming the other one of electrodes is provided for the rear surface of the light emitting layer 13.

The transparent insulating film 9 of the outer surface of the key-top portion 3 may be formed, so as to have a thickness of about 25 to 500 µm, and the transparent insulating film may be formed from a material selected from the following: polyvinyl alcohol, polyethylene, polyetheneterephthalate, polyethylenenaphthalate, polyacryl, polycarbonate, polystyrene, polyfrroethylenepropyrene, polychlorotrifluoroethylene, polyvinylidene, polyimide, poliamideimide, polyethersulfone, polysulfone, polyphenylenesulfide, polyamide, and polyarylate; styrenic base, polyester base or polyamid base thermoplastic elastomers and copolymers thereof; and modified materials such as alloys thereof; composite layer products formed by laminating several kinds of films; or the like. In the first embodiment, it will be desirable to use a resin, which is suitable for easily forming the key-top portion 3 and which has a softening point of about 50 to 200° C., preferably 100 to 150° C., and has a low gas permeability. After molding, it will be also desirable, for protecting the light emitting layer 13 and extending its lifetime, to form an inorganic oxide, as a gas barrier layer, such as silicon dioxide or aluminum oxide to an outer surface thereof by means of a vapor deposition method or a sol-gel process.

The conductive polymer utilized for the transparent electrode 10 are such as: polyacetylene, polyparaphenylene, polypyrrole, polythiophen, polyaniline, polyphenylenevinylene, polyselenophen, polyazulene, polypyrene, polycarbazole, polypyridazine, polynaphthylene, or polyfluorene; compounds, into which such substituents as alkyl or alkoxyl group are introduced into the foregoing compounds, such as polyethylenedioxythiophene, polythienylene-vinylene, poly(3-methylthiophene), poly(3,4-dimethylthiophene), poly(3-thiophene-β-ethansulphonate), polymethylpyrrole, poly(3-hexylpyrrole), poly (3-methyl-4-pyrrole carboxylic acid methylester), polycyanophenylenevinylene, polydimetoxyphenylenevinylene derivative; or conjugate conductive polymers such as polyisoprene modified substance.

In the above-described conductive polymers, it will be desirable to utilize derivatives of polypyrrole, polythiophen and polyaniline having good resistance to oxygen and humidity, good transparency and good conductivity in additional consideration to the influence of a dopant. In the case of a use to an organic EL, it will be desirable to use derivatives of polyaniline and polythiophen having a high work function as an anode.

Since the conductive polymers have a conjugate double bond, thereby being rigid and poor in adhesion ability, it is preferred to apply an anchor coat having a high polarity so as to achieve a good adhesion to a base member. Polyurethane, polyamide, polyacrylamide or like, or polymer having, as side chain, amino group, hydroxyl group, nitrile group, carboxyl or cyano group can be preferably used as the anchor coat.

Furthermore, since a conductive polymer itself does not show a desired resistance, it is necessary to carry out the doping. For this reason, , as an acceptor, maybe halogen such as iodine and bromine, Lewis acid such as $PF_5$, $AsF_5$ and $BF_3$, protonic acid such as HF, HCl, $H_2SO_4$, organic acid such as paratoluene sulfonic acid and parametoxyethyltoluenesulfonic acid, transient metal compounds such as $FeCl_3$, $TiCl_4$, organic substances such as tetracyanodimethane, tetracyanotetraazanaphthalene, chloranil, or alkali metals such as Li, Na and K or alkali earth metals such as Ca, Sr, Ba as a donor.

In order to increase the stability against moisture and temperature, it is necessary to pay attention to dedoping. It is required to avoid the use of an electrolytic anion, cation or the like. A coordinate bond or copolymerization with a conductive polymer is an effective method for fixing. In particular, it is easy to introduce a dopant to dendrimer composed by sequentially bonding central core molecular with AB2-type being a starting material, origomer or polymer such as polystylene, polymethylmethacrylate, polyurethane or fullerence molecular, and to carry it as functional group, which is especially desired because of an increased bonding property to the transparent insulating film 9. The dopant, which became multifunctional with a carrier being a center thereof, acts to bridge the conductive polymer molecules, to be stabilized and to decrease resistance, thereby being extremely useful. In a sealed state of the conductive polymer, the influence of the dedoping becomes very small, and therefore, it is better to accommodate the conductive polymer in a mold body. Moreover, in order to reduce the conductivity, it is effective to elongate the conductive polymer to thereby shorten a distance between the molecules of the conductive polymer and elongation at the time the molding will be utilized.

At the time of drawing process, a tensile force is applied to, specifically, a portion (elongated portion) corresponding to a side surface of the key-top portion 3, and therefore, it is necessary for the transparent insulating film 9 and the transparent electrode 10 to be formed from a material which is hardly broken or which will hardly increase in resistance will be selected as a material for the elongating portion. Accordingly, the conductive polymer is a suitable material. According to the molding process, the specific resistance of the conductive polymer does not change, but a physical thickness is made thinner and the conductive polymer is elongated, thereby increasing its resistance. For this reason, the conductive polymer that is disposed at a peripheral portion (elongated portion) of the pattern of the display section 2 having a high elongating rate is formed to be thickened so as to suppress the absolute value of the resistance. In the case where the base portion of the display section 2 or side surface of the key-top portion 3 is opaque, it may be possible to compensate for the increasing of resistance by means of a conductive ink, which will be described below.

In a case where an excessive elongation over 100% is made, there is a concern of an increase in resistance. In such a case, the conductivity will be maintained by mixing a fine conductive fiber having a diameter of not more than 0.5 µm to the conductive polymer. In the case of the fiber diameter exceeding 0.5 µm, it is not substantially transparent and the fiber is made to be rigid, and thus, the fiber is not suitable for molding. An aspect ratio is desired to be more than 10, preferably more than 20, or even more preferably, more than 50, and with respect to printing, the length of less than 0.1 mm will be desired.

Furthermore, in a case of an excessive elongation over 200%, by mixing a fine conductive fiber having a diameter of not more than 1 µm to the conductive polymer, the conductive fiber is oriented at the molding time and the conductivity can be maintained.

There is provided, as such a conductive fiber, a teared carbon fiber that is made from a polyacrylonitrile based fiber or a carbon coated or a silver plated ceramics whiskers that are made from zinc oxide or potassium titanate, for example. However, it is desired to use a flexible fiber of, for example, silver plated synthetic fibers such as acrylic fiber, rayon, polyester fiber, phenol fiber or like, or single-wall nano-tube or multi-wall nano-tube, and the nano-tube is a conductive fiber having a diameter of not more than 0.2 µm, thereby being convenient. Although a compounding amount is determined in accordance with a predetermined resistance value, the compounding amount is in a range of 0.1 to 20% by weight, and it is of course natural that the transparency is better as the diameter is finer or the compounding amount is smaller.

The conductive polymer is obtained by polymerization in which a precursor monomer is polymerized by using an oxidizing agent or a catalyst, heat treatment of an intermediate product composed of a non-conjugated polymer, or an electrolytic polymerization in which an aromatic compound is polymerized through electrochemical oxidization or reduction as a monomer. The method is not, however, limited to one of these methods.

It may be possible to form, on the transparent insulating film 9, a low molecule product of a conductive polymer through vapor deposition or the like, or to form the conductive polymer layer through a general printing coating method by using emulsion or a solution (aqueous or solvent) containing conductive polymer so as to have a thickness of about 0.1 to 25 μm. In the case of the conductive polymer, the film thickness and the resistance are often non-ohmic, and even if the film is thickened, there may arise a certain case where a resistance reduction in conformity with this thickness cannot be achieved and the light transmittance will be made worse. Because of this reason, it is necessary to preliminarily determine a necessary thickness.

The transparent electrode 10 should have a surface resistance of not less than 10 Ω/□ and, preferably, not less than 100 Ω/□, and the transparent electrode 10 should have a light transmittance of not more than 90% and, preferably, not more than 80%. The surface resistance value and the light transmittance of the transparent electrode 10 are in a contrary relation to each other, and hence, in the case of the surface resistance of less than 10 Ω/□, the dopant amount is increased and coloring is made to be higher, thus obtaining no desired color, hardening of the conductive polymer and showing no adequate elongation. Although it is desired for the light transmittance to have a high percentage, in the case of exceeding 90%, the surface resistance is excessively increased and power consumption will thereby be increased.

The light emitting layer 13 of the area emitter 4 has an emitting structure which utilizes a electricity-light conversion mechanism and illuminates evenly the area of the display section 2. In consideration of the molding material of the resin and its composite structure, the molding material of the resin may be an inorganic EL in an organic group, organic EL or LEC (Light Emitting Electrochemical Cell: Electrochemical Light Emitting Element), or the like, which may include one that directly emits visible light, or others such as one that emits ultraviolet light and converts the ultraviolet light to visual light. These ones require opposite electrodes for power supply, and in the first embodiment, one electrode is the transparent electrode 10 and the other electrode is the base electrode 14.

The inorganic EL is provided with the light emitting layer 13 having a thickness of about 5 to 50 μm between two opposed electrodes, including one transparent electrode and an alternating current of 20 to 100 V and 50 to 400 Hz is applied to thereby emit the same. In the case of the direct current cell such as for a cellular phone, it will be necessary to increase the voltage and convert the voltage into an alternating current by an inverter or the like.

The light emitting layer 13 is manufactured in a manner of dispersing powdery inorganic fluorescent material (phosphor), such as zinc sulfide, into an organic material binder of a high dielectric substance such as cyanoethyl cellulose, cyanoethyl sucrose, cyanoethyl pulurane or the like, dissolving the inorganic fluorescent material into a solution by utilizing acetonitrile, dimethylformamide, dimethylacetamide, or the like, and working the same with a wet-type process. Particularly, for the fluorescent material, a multi-coloring process is effected by doping a metal such as copper, iron or the like. Further, it is possible to enhance properties, such as a moisture-proof property or adhesiveness to a base member, by encapsulating the fluorescent material with a microcapsule by using ceramic through plasma polymerization, a sol-gel process or other existing methods. In addition, field efficiency may be increased by means of an excitation reflector layer formed by further combining, to such a binder, a high dielectric material such as barium titanate or potassium titanate.

In order to bond the light emitting layer 13, in a reliable state, to the transparent electrode 10 formed of a conductive polymer having a low bonding performance, it is desired to use a material that is substantially equivalent to that of the anchor coat mentioned hereinabove.

The light emitting layer 13 can be formed from an ink comprising a fluorescent material powder that is obtained through doping copper to zinc sulfide, a high dielectric substance binder such as cyanoethyl cellulose, cyanoethyl sucrose, cyanoethyl pulurene or the like, a high dielectric ceramic powder such as barium titanate and a polar solvent such as acetonitrile, or the light emitting layer 13 can be formed from a solution comprising a hole transferable binder such as polyvinylcarbazole, or an electron transferable color such as trishydroxyquinolinola aluminium complex and toluene.

The inorganic EL sheet is conventionally utilized as a flat-shape light source, and in the present invention, the inorganic EL sheet is adopted only for the display section 2 so that the area of the flat light source to be utilized can be reduced to about 1/5 to 1/100 in comparison with the conventional area of the flat light source which is utilized as a back light, thereby reducing the power consumption.

The organic EL sheet includes a low molecular type and a high molecular type according to light emission material to be used. The high molecular type therein having a thick film is easily workable, and therefore, in the present invention, the explanation is limited to this type, in which the light emitting layer 13 is clamped and supported between the opposed two electrodes including at least one of transparent electrode. The light emitting layer is provided to have a thickness of about 0.1 to 0.15 μm and, as is necessary, an electron injection layer, a hole injection layer, a carrier layer or a similar, functional layer are provided, and a direct current voltage of 5 to 20 V is applied. The light emitting layer 13 may be a soluble π-conjugated polymer such as: polyparaphenylene vinylene derivative material, polythiophene derivative material, polydialkylfluorene, polyparaphenylene derivative material, polyacetylene derivative material, polyvinylcarbazole derivative material or the like (published by CMC company "Organic EL Material and Display"). These solutions are applied through a spin-coat, ink-jet printing process or a similar process. The color is determined by an energy gap that is possessed by respective materials, and as the energy gap is larger, the color will become a short-wavelength side. The light emitting layer 13 and the upper and lower electrode layers are designed in consideration of the balance of the electron injection and the hole injection. The high molecular type includes a color dispersion type which has a simple structure. This structure is formed of clamping a layer between the electrons, comprising a polymer such as polyvinyl carbazole or polyphenylene vinylene, quinolino, an electron transfer component such as trishydroxyquinolino aluminium complex or a positive hole transfer component such as oxadiazole derivative or the like, a coumarin derivative as a dopant, and a laser color such as quinacridone, rubrene or the like. As another material, polymethylphenylsilane of a σ-conjugated polymer has an emission peak at near-ultraviolet and it is made as a visual emission by mixing the laser color such as butylebenzooxazolilthiophene, a benzopyranone derivative or the like.

The LEC has a structure in which only the light emitting layer 13 is clamped between the opposed two electrodes having at least one transparent electrode, and the LEC has a thickness of about 15 µm. The light emitting layer 13 is comprised of, similar to the organic EL, a conjugated polymer, a polymer or oligomer of an electrolytic substance having ethylene oxide or phosphazen, for example, and a metal salt such as lithium trifluoromethanesulfonate. When a direct current voltage of 3 to 5 V is applied, the cation or anion of salt electrochemically dopes a conjugated polymer and produces P-type or N-type semiconductors in good electrochemical balance, and provides electrons or holes to the conjugated polymer with high efficiency, thereby being emitted similar to organic EL (W096/00968).

In the above-described three types of area emitters 4, the inorganic EL is preferred because the film thickness can be easily controlled, and the inorganic EL has a resistance to environment. Further, LEC is also preferred because of its simple structure and because there is no limit in the use of an electrode material, and as a result, the film thickness can be easily controlled and power consumption can also be reduced.

The base electrode 14 opposing the transparent electrode 10 is formed from a metal or an alloy of gold, silver, copper, nickel, aluminium, magnesium, calcium, lithium, palladium, platinum or the like, for example; a conductive ceramic such as tungsten carbide, silicone carbide, tin oxide or indium oxide, or fullerene, which is subjected to photo-polymerization, electron irradiation polymerization, plasma polymerization, electrolyte polymerization or the like. In the case of the light emitting layer 13 of an organic EL, a material having a large difference in working function between the material and that of the transparent electrode 10 is selected. In addition, the base electrode 14 will be formed from a conductive ink that is obtained by mixing fine particles of these materials or a conductive filler such as carbon black, graphite or the like in an insulating resin solution of epoxy resin, urethane resin, silicone resin or the like.

Similar to the transparent electrode 10, in order to suppress the resistance change due to the elongation, it will be desired to mix the fine particles of the conductive ceramics as mentioned above or the conductive filler such as carbon black or graphite with an organic polymer such as low cross linking density thermosetting resin that is made from such as epoxy resin, urethane resin, silicone resin or the like, or a thermoplastic resin having a large molecular weight such as unvulcanized synthetic rubber, thermoplastic elastomer or the like or such polymers or polyamode, polyester, polyacryl or chlorinated polyolefine. Further, the base electrode 14 may be formed, in place of the organic polymer, from conductive polymer as mentioned above.

In the use of the conductive polymer, the binder is itself made to be conductive so that the conductivity can be maintained even if the chain of the conductive filler is broken, thus being further preferred. In addition, in the case of the use of conductive fiber or a carbon nano tube having flexibility, resistance can be reduced due to a by-pass effect, and the conductivity can be maintained, thus being preferred.

A method of manufacturing the push button switch member according to the first embodiment mentioned above will now be explained.

The belt-shaped transparent electrode 10, having a width substantially equal to a width of the top surface portion of the key-top portion 3, is formed at a portion at which the key-top portion 3 of the transparent insulating film is in a state where the transparent insulating film is disposed at the lowest position. A negative printing using an opaque coloring ink having a light shielding property and an insulating property is then performed, from the upper portion of the transparent electrode 10, with the position corresponding to the top surface portion of the key-top portion 3 being the center thereof. According to such an operation, the opaque color layer 11 having an area which is sufficient for covering the outer peripheral surface, except for the rear surface portion, of the key-top portion 3. In such an operation, the punched-out portion 12 contouring the shape of the pattern portion of the display section 2 for displaying the switching function is formed at the portion at which the top surface portion of the key-top portion 3 of the opaque color layer 11 is positioned.

Next, on the opaque color layer 11, there is formed the light emitting layer 13 by printing the emitter material in a size that is slightly smaller than the size of the top surface portion of the key-top portion 3 including the punched-out portion 12. According to this operation, the light emitting layer 13 is embedded in the punched-out portion 12. Furthermore, on the light emitting layer 13, there is formed the base electrode 14 having substantially the same size as the size of the light emitting layer 13 so that the light emitting layer 13 stays in the punched-out portion 12 of the opaque color layer 11 to thereby complete manufacturing of the printed sheet (not shown) before the drawing process.

As the emitter material of the light emitting layer 13; one of the examples of the emitting material is an ink comprising a fluorescent material powder that is obtained through doping of copper to zinc sulfide, a high dielectric substance binder such as cyanoethyl cellulose, cyanoethyl sucrose, cyanoethyl purulene or the like, a high dielectric ceramic powder such as barium titanate, and a polar solvent such as acetonitrile into which such ingredients are mixed, or, a toluene solution comprising a hole transferable binder such as polyvinylcarbazole, an electron transferable color such as trishydroxyquinolinola aluminium complex, and toluene into which such ingredients are mixed.

The formation of the pattern portion and the base portion of the display section 2 and the formation of the opaque color layer 11 will be performed by utilizing a generally known method of screen printing by using a usual transparent or opaque ink, ink-jet printing, thermal transfer printing, gravure printing, spray coating, dip coating, spin coating, vapor deposition or a similar method of printing. Further, in some cases, a color of the printed base may be utilized as it is.

Next, the printed sheet before the drawing process mentioned above is subjected to the drawing process that is in conformity with the shape of the desired key-top portion 3 through the pneumatic/vacuum molding or press molding process. Then, a shaped sheet having a recess to which the key-top body 16 is provided is formed. At this time, in order to not significantly vary the resistances of the transparent electrode 10 and the base electrode 14, it is necessary for a bent portion of the transparent electrode 10 to ensure an adequate roundness.

In the next process, thermosetting resin is poured into the recess of the shaped sheet that is formed through the drawing process and then is hardened in a mold. Thereafter, a conductive ink is coated to the front end portion of the pressing projection 8 of the key-top portion 3 to thereby form the movable contact point 7, thereby completing the push-button switch member 1 according to the first embodiment.

The formation of the base, the color layer and the light emitting layer 13 is performed by means of usual screen printing, ink-jet printing, thermo-transfer printing, gravure printing, tampon printing, spraying coating, dip coating, spin coating, vapor deposition or the like.

The transparent color layer 15 and the opaque color layer 11 are prepared by mixing dye or a pigment with a binder such as a soft resin or an elastomer. These layers are tightly brought into contact with the transparent insulating film 9 and it is desired to have the same elongation property and to be formed of the same resin material. Further, although it is also desired to have a thickness of 1 to 20 $\mu$m, it is preferable to have a thickness of more than 3 $\mu$m so as to be easily printed and a thickness of less than 10 $\mu$m because the layer that is thinner in thickness is suitable to be molded.

The shaping of the key-top portion 3 is generally performed through blow-molding, vacuum-molding, mold-molding process or a like process, which is usually utilized. In order to prevent a misalignment of the design on the display section 2, the mold-molding (molding using mold) process will be preferred. In this process, the transparent insulating film 9, except for the portion including the display section 2, is heated to a thermally deformable temperature to a portion and, after maintaining the shape in conformity with the mold, a desired shape of the key-top portion 3 will be obtained through the cooling before the pressure reduction. Since the expansion speed is fast, it is possible that the resistance of the conductive material will easily increase, and hence, it is preferred that the speed is less than 100 mm/min. or, more preferably, less than 50 mm/min.

A material filling the key-top body 16 forming a plunger portion or the like is selected from a hard or soft resin, or an elastomer. Although it is not limited for this material to have a thermoplastic property or a thermosetting property, or having a pellet shape or a liquid state, a liquid state thermosetting resin will be desired for use because the liquid state thermosetting resin is easily poured. The formation of the liquid state thermosetting resin will be performed by using an injection mold, a transfer mold, potting or a like method, and it is also possible to bond one which has been preliminarily molded.

Next, the respective patterns of the display section 2 will now be explained.

The display section 2 is composed of a pattern portion consisting of a letter, symbol or figure and its base portion, at least one of which is self-emissive, and the self-emitting portion of the display section 2 has paired portions where one of the paired portions is composed of the light emitting layer 13 that is clamped between the transparent electrode 10 and the base electrode 14.

The letter, symbol or figure constituting the pattern portion of the display section 2 is formed by a usual printing method, and in relation to background of the display section 2, various designs will be devised in combination of transparent light, self-luminous light, reflection light and coloring difference.

Figure 6:
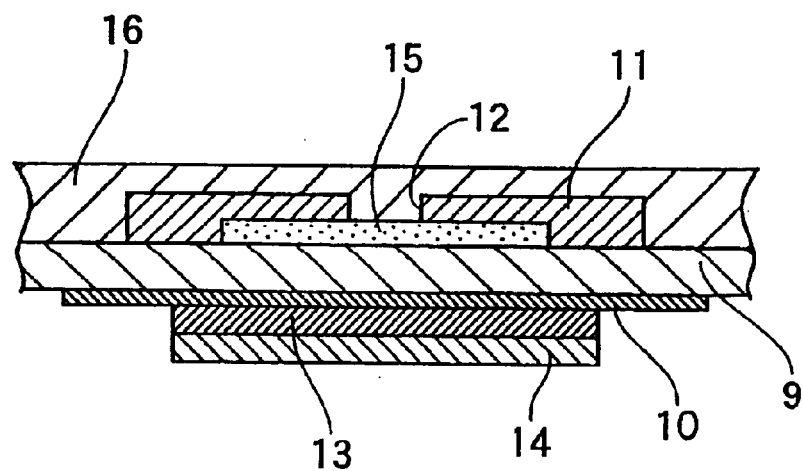
FIG. 6 is a sectional view of an essential portion of a fifth example of the display section.
Figure 7:
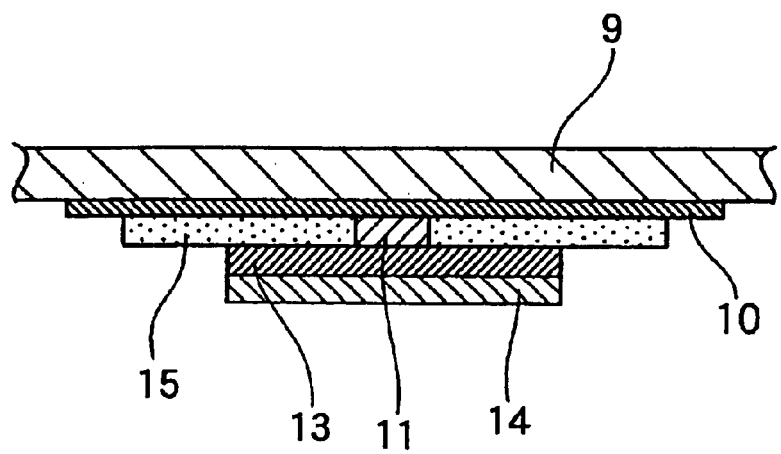
FIG. 7 is a sectional view of an essential portion of a sixth example of a display section.
Figure 8:
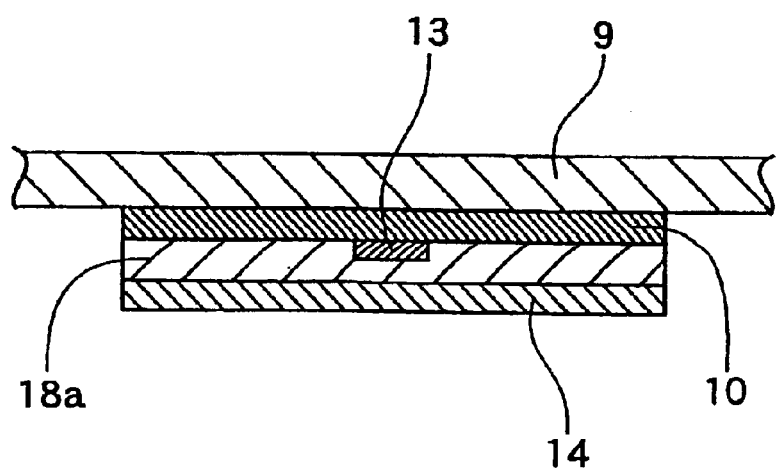
FIG. 8 is a sectional view of an essential portion of a seventh example of the display section.
Figure 9:
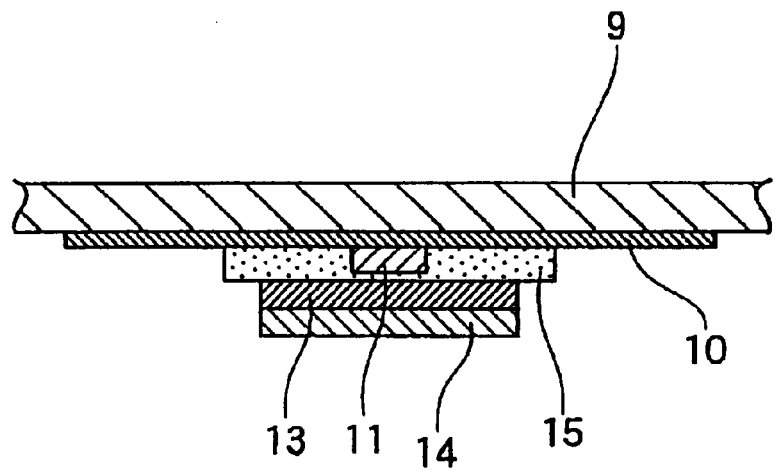
FIG. 9 is a sectional view of an essential portion of an eighth example of the display section.
Figure 10:
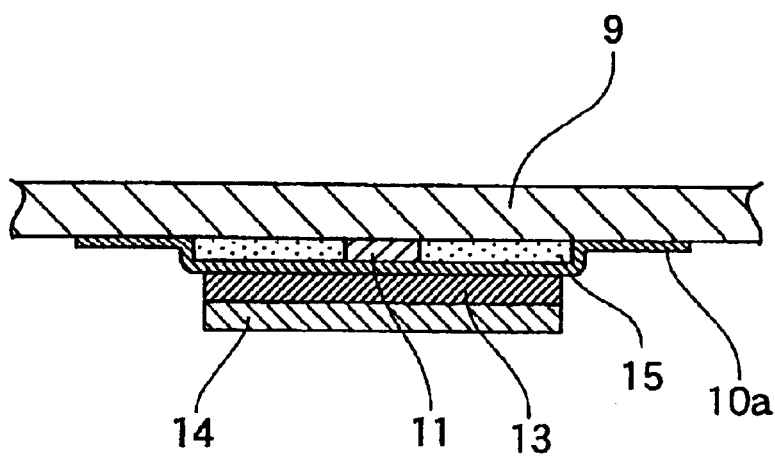
FIG. 10 is a sectional view of an essential portion of a ninth example of a display section.

FIGS. 2 to 11 are sectional views showing display sections having different designs, in which FIGS. 2 to 8 show patterns of the display sections of which the letters, symbols or figures emit light, and FIGS. 8 and 10 show patterns of the display sections of which the base portions emit light.

Figure 2:
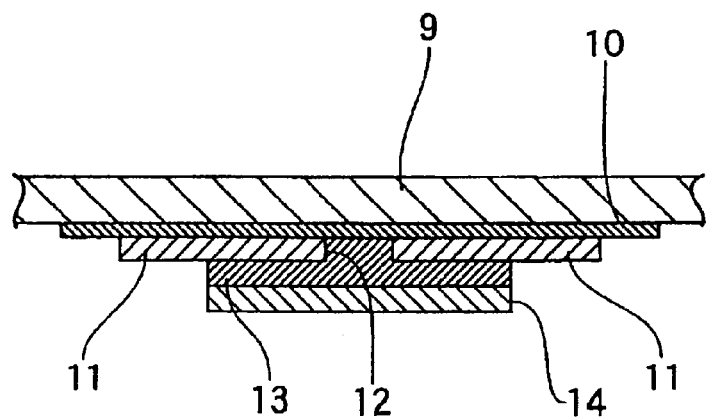
FIG. 2 is a sectional view of an essential portion of a first example of a display section of the push-button switch member according to the first embodiment of the present invention.

The first example of the display section 2 shown in FIG. 2 has a laminated structures, from the upper side, in the order of, the transparent insulating film 9, the transparent electrode 10, the opaque color layer 11 including the punched-out portion 12, the light emitting layer 13 embedding the punched-out portion 12, and the base electrode 14, which is the same structure as that of the first embodiment of FIG. 1.

Figure 3:
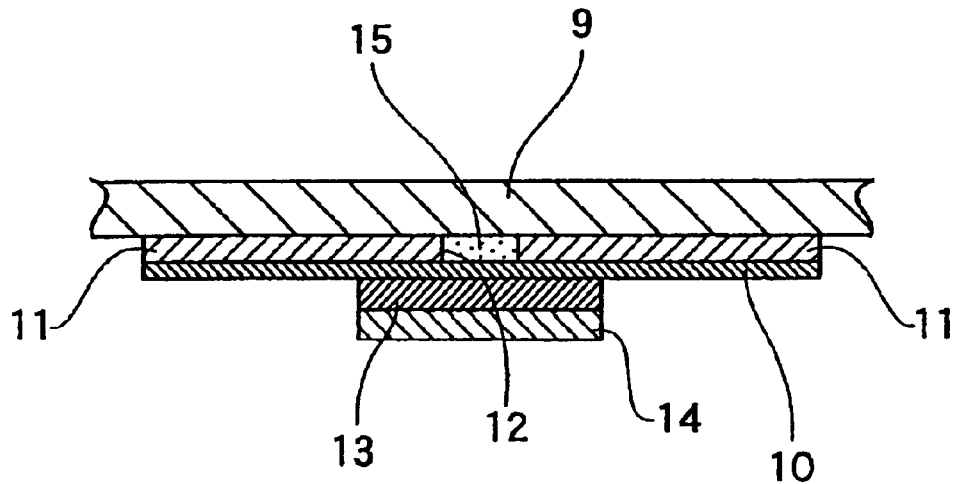
FIG. 3 is a sectional view of an essential portion of a second example of the display section.

The second example of the display section 2 shown in FIG. 3 has a laminated structures, from the upper side, in the order of, the transparent insulating film 9, the opaque color layer 11 constituting the base portion including the punched-out portion 12, a coloring transparent layer 15 constituting a pattern portion embedding the punched-out portion 12, the transparent electrode 10, the light emitting layer 13, and the base electrode 14.

Figure 4:
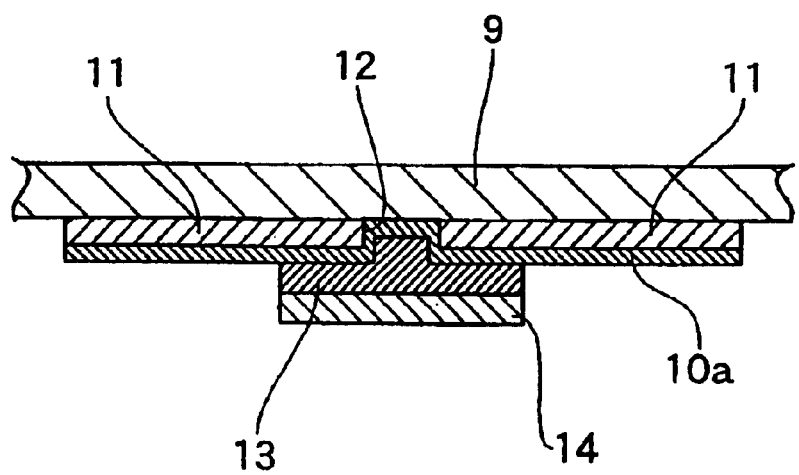
FIG. 4 is a sectional view of an essential portion of a third example of a display section.

The third example of the display section 2 shown in FIG. 4 has a laminated structures, from the upper side, in the order of, the transparent insulating film 9, the opaque color layer 11 constituting the base portion including the punched-out portion 12, a coloring transparent electrode 10a constituting a pattern portion to be inserted to the punched-out portion 12, the light emitting layer 13 embedding the punched-out portion 12 through the coloring transparent electrode 10a, and the base electrode 14.

Figure 5:
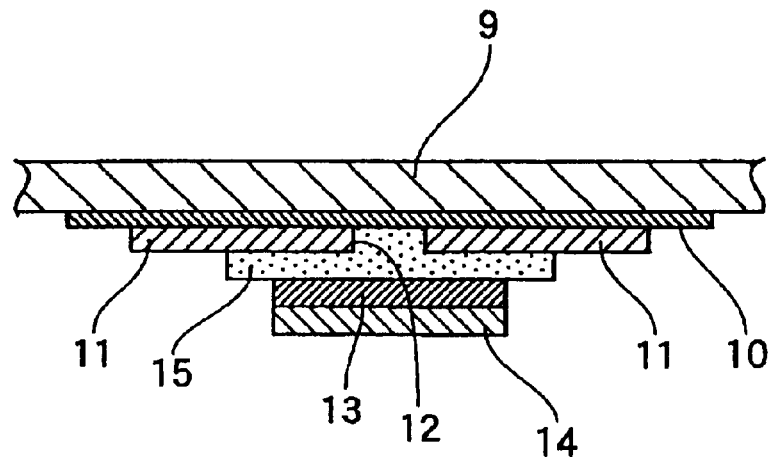
FIG. 5 is a sectional view of an essential portion of a fourth example of the display section.

The fourth example of the display section 2 shown in FIG. 5 has a laminated structures, from the upper side, in the order of, the transparent insulation film 9, the transparent electrode 10, the opaque color layer 11 constituting the base portion including the punched-out portion 12, the transparent color layer 15 constituting the pattern portion embedding the punched-out portion 12, the light emitting layer 13, and the base electrode 14.

The fifth example of the display section 2 shown in FIG. 6 has a laminated structures, from the upper side, in the order of, a transparent over-coat layer 16, the opaque color layer 11 constituting the base portion including the punched-out portion 12 (in which the punched-out portion 12 is embedded with the over-coat layer 16), the transparent color layer 15 constituting the pattern portion, the transparent insulating film 9, the transparent electrode 10, the light emitting layer 13, and the base electrode 14.

The sixth example of the display section 2 shown in FIG. 7 has a laminated structures, from the upper side, in the order of, the transparent insulating film 9, the transparent electrode 10, the opaque color layer 11 constituting the pattern portion, the transparent color layer 15 constituting the base portion, the light emitting layer 13, and the base electrode 14.

The seventh example of the display section 2 shown in FIG. 8 has a laminated structures, from the upper side, in the order of, the transparent insulating film 9, the transparent electrode 10, the light emitting layer 13 constituting the pattern portion, a coloring dielectric layer 18a, and the base electrode 14.

The eighth example of the display section 2 shown in FIG. 9 has a laminated structures, from the upper side, in the order of, the transparent insulating film 9, the transparent electrode 10, the opaque color layer 11 constituting the pattern portion, the transparent color layer 15 constituting the base portion covering the outer periphery of the opaque color layer 11, the light emitting layer 13, and the base electrode 14.

The ninth example of the display section 2 shown in FIG. 10 has a laminated structures, from the upper side, in the order of, the transparent insulating film 9, the opaque color layer 11 constituting the pattern portion, the transparent color layer 15 constituting the base portion, the transparent electrode 10 covering the outer periphery of the opaque color layer 11 and the transparent color layer 15, the light emitting layer 13, and the base electrode 14.

Figure 11:
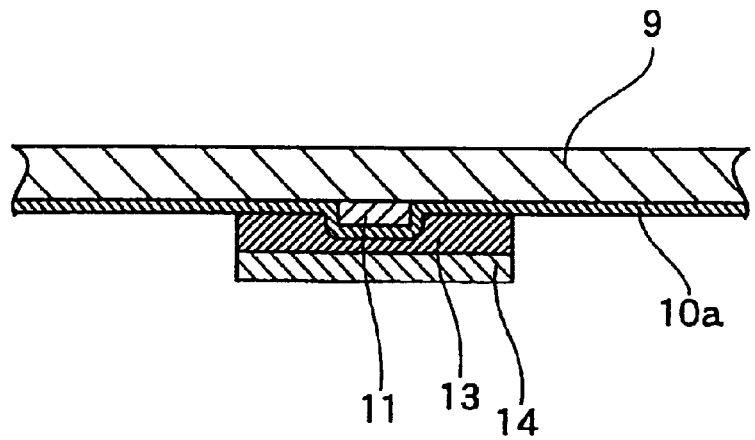
FIG. 11 is a sectional view of an essential portion of a tenth example of the display section.

The tenth example of the display section 2 shown in FIG. 11 has a laminated structures, from the upper side, in the order of, the transparent insulating film 9, the opaque color layer 11 constituting the pattern portion, the transparent color electrode 10a covering the outer periphery of the opaque color layer 11, the light emitting layer 13, and the base electrode 14.

In the examples shown in FIGS. 4 and 11 of the above-described examples, the transparent color electrode 10a is formed by coloring the transparent electrode 10, and in such examples, since the transparent color layer 15 is not necessary to be disposed, the manufacturing process can be simplified, thereby reducing manufacturing cost.

Furthermore, in the example shown in FIG. 8, since the letter, symbol or figure is formed from the light emitting layer 13, it is not necessary for the opaque color layer 11 to be printed, thereby reducing the number of printing steps and, hence, simplifying the manufacturing process.

Further, the transparent color layer 15 and the opaque color layer 11 are formed by mixing dye or a pigment with a soft resin or an elastomer as a binder, and it is desired to be disposed closely in contact to the transparent insulating film 9 similar to having the elongating property and it is preferred to be formed from resin similar to the transparent insulating film 9.

Second Embodiment of the Present Invention

The push-button switch member of the second embodiment of the present invention has substantially the same structure as the structure of the first embodiment except that a conductive member connected to the transparent electrode and the base electrode is provided. A structure near the top surface portion of the key-top portion according to the second embodiment will be explained below with reference to FIG. 12 which substantially corresponds to the details of FIG. 3.

The opaque color layer 11, as a shielding layer, and the transparent color layer 15, as the display section 2, are disposed below the transparent insulating film 9. An anchor coat layer 17 is formed under the transparent insulating layer 15 to enhance adhesion performance of the transparent electrode 10. This anchor coat layer 17 may be eliminated if the transparent color layer 15 has the same function as that of the anchor coat layer 17. It is not necessary to make the transparent electrode 10 large and, in order to keep the insulated state from the base electrode 14, it is required for the transparent electrode 10 to not be overlapped with a conductor member 14d that is continuous to the base electrode 14. For the light emitting layer 13 and the dielectric layer 18b, it is necessary for the light emitting layer 13 and the dielectric layer 18b to be formed so as to cover the transparent electrode 10 at a portion at which the transparent electrode 10 and the base electrode 14 are overlapped for the purpose of maintaining the insulating performance of the base electrode 14 and the transparent electrode 10. The base electrode 14 is covered by an insulating thin film 19. Accordingly, the insulated state between the base electrode 14 and the transparent electrode 10 can be maintained, and at the elongated formation of the base electrode 14, the flow of material of the conductor member 14d of the base electrode 14, which is now softened and flowed, can be restricted so as to thereby suppress the increasing of resistance of the base electrode 14.

The field efficiency of the dielectric layer 18b may be increased by adding a high dielectric substance such as barium titanate, potassium titanate or the like to the binder of the dielectric layer 18b. In order to establish the insulation between the base electrode 14 and the transparent electrode 10, volume resistance and film thickness of the dielectric layer 18b are important factors, and it is necessary for the dielectric layer 18b to have the volume resistance of more than $10^{13}$ under application of D.C. 100V and the thickness of at least not less than 10 μm. If this insulating performance is lowered, lightening luminance is lowered and the field efficiency is deteriorated, and thus, attention to this consideration is required. Of course, the formation of a pin hole or the mixing of a foreign material are to be prevented. In the use of a high density ink such as ink that does not include a solvent, a thickened film can be formed at once and the formation of the pin holes due to the volatilization of the solvent can be reduced, and as a result, the insulating performance can be easily maintained.

A storage modulus of elasticity (elastic modulus) of the binder at the molding temperature is not less than the elastic modulus of the base member and the insulating thin film 19 and, hence, it is necessary for the binder to take a fluidized state at an earlier time and to be easily elongated. In a dynamic visco-elasticity measurement, it is desired for the storage modulus to be not more than a single figure, and more preferably, not more than two figures. In a case where a specimen does not have a size that is sufficiently larger for the measurement of the dynamic visco-elasticity, a micro-hardness tester will be utilized for distinguishing the largeness of a storage modulus in a state of maintaining a necessary temperature of the specimen.

The top surface portion of the key-top portion 3 is not distorted and is hardly elongated at the time of molding. However, a portion of the key-top side surface is maximally elongated at the time of molding. Therefore, the existence of an interface between each material near the top surface portion should be avoided because damage or breaking tend to occur at the overlapped portion if the transparent electrode 10 or the conductive member 10d which is continuous thereto and the base electrode 14 or the conductive member 14d which is continuous thereto are overlapped near the top surface portion.

Furthermore, in order to avoid an accidental breakage or increase of the resistance due to uneven molding, it is preferable for the stability of the light emission to connect a plurality of switch circuits, as a redundant circuit, to the transparent electrode 10 and the base electrode 14, respectively.

Figure 13:
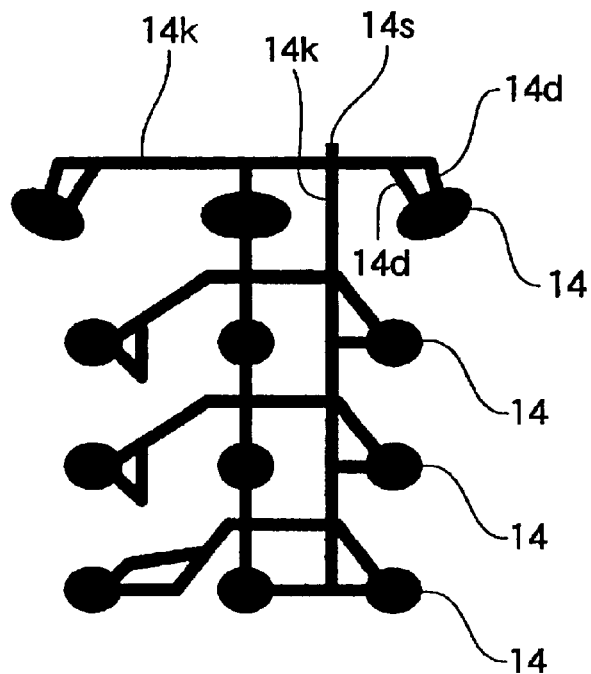
FIG. 13 is a plan view showing a base electrode of the push-button switch member of the second embodiment shown in FIG. 12 and a conductive pattern which is continuous to the base electrode.

FIG. 13 is a plan view illustrating one example of a pattern of an arrangement of a plurality of base electrodes and the conductor members which are continuous thereto to be utilized for the member of the push-button switch according to the second embodiment of the present invention.

Each of the base electrodes 14 corresponding to the display sections 2 of a plurality of key-top portions 3 has an approximately circular or elliptical shape having an area that is sufficient for entirely covering the bottom surface side of the light emitting layer 13, and two belt-shaped conductive members 14d extend from the outer peripheral portion of each of the base electrodes 14, which are collected into one main conductive member 14s through path lines 14k and, finally, the main conductive member 14s is connected to the electrode terminal of the push-button switch member 1.

Figure 14:
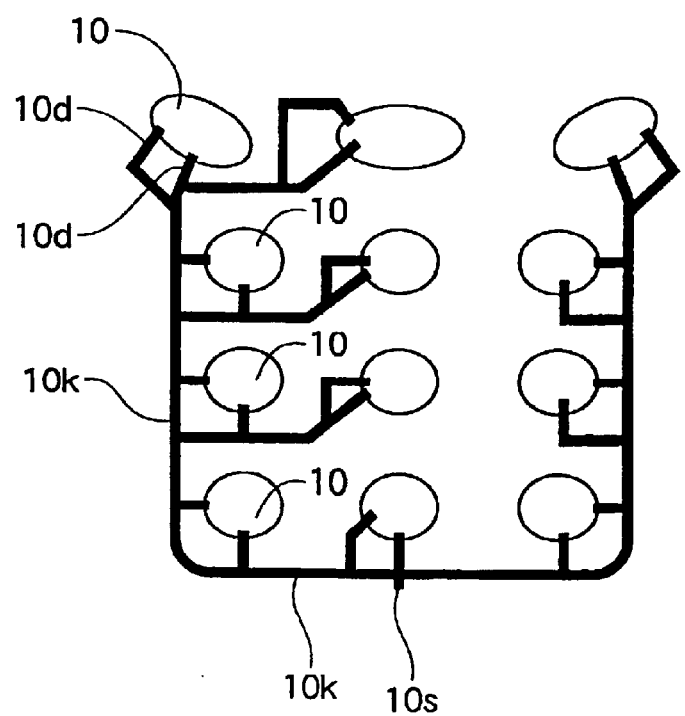
FIG. 14 is a plan view showing a transparent electrode of the push-button switch member of the second embodiment shown in FIG. 12 and a conductive pattern which is continuous to the transparent electrode.

FIG. 14 is a plan view illustrating one example of a pattern of an arrangement of a plurality of transparent electrodes and the conductive members which are continuous thereto to be utilized for the member of the push-button switch according to the second embodiment of the present invention.

Each of the transparent electrodes 10 corresponding to the display sections 2 of a plurality of key-top portions 3 has an approximately circular or elliptical shape having an area that is sufficient for entirely covering the top surface side of the light emitting layer 13, and two belt-shaped conductive members 10d extending from the outer peripheral portion of each of the transparent electrodes 10, which are collected into one main conductive member 10s through path lines 10k and, finally, the main conductor member 10s is connected to the electrode terminal of the push-button switch member 1.

Figure 15:
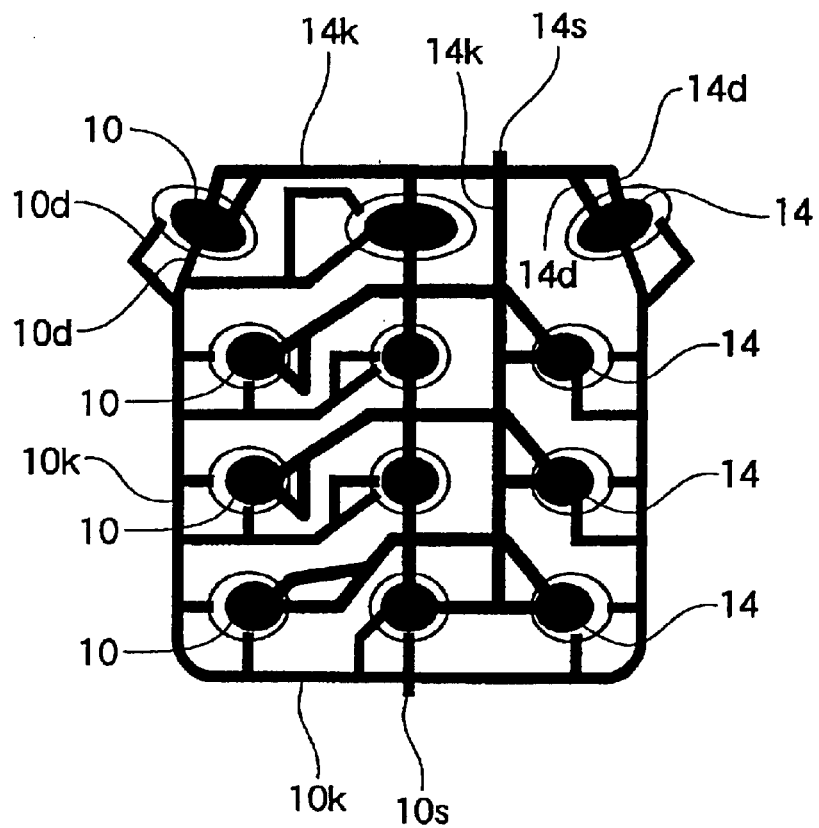
FIG. 15 is a plan view showing an overlap state in which the transparent electrode and the conductive pattern which is continuous to the transparent electrode are overlapped with the base electrode of the push-button switch member and the conductive pattern which is continuous to the base electrode.

FIG. 14 illustrates a case in which an outer shape of the transparent electrode 10 is one size larger than the size of the base electrode 14, and FIG. 15 shows a case in which the pattern of the base electrode 14 is overlapped with the pattern of the transparent electrode 10. That is, although the base electrode 14 is covered by the transparent electrode 10 (in a completed product, the light emitting layer 13 is interposed therebetween), these electrodes 14 and 10 are arranged such that the conductive members 14d extending from the base electrodes 14 and the conductive members 10d extending from the transparent electrodes 10 are not overlapped with each other and the path lines 14k, and the main conductive member 14s of the base electrodes 14 and the path lines 10k and the main conductive member 10s of the transparent electrodes 10 are not overlapped with each other.

Accordingly, there is no concern of contacting the conductive members 14d which are connected to the base electrode 14 to the conductive member 10d of the transparent electrodes 10, and they can be prevented from being damaged or broken, thereby ensuring stable back-lighting.

Figure 12:
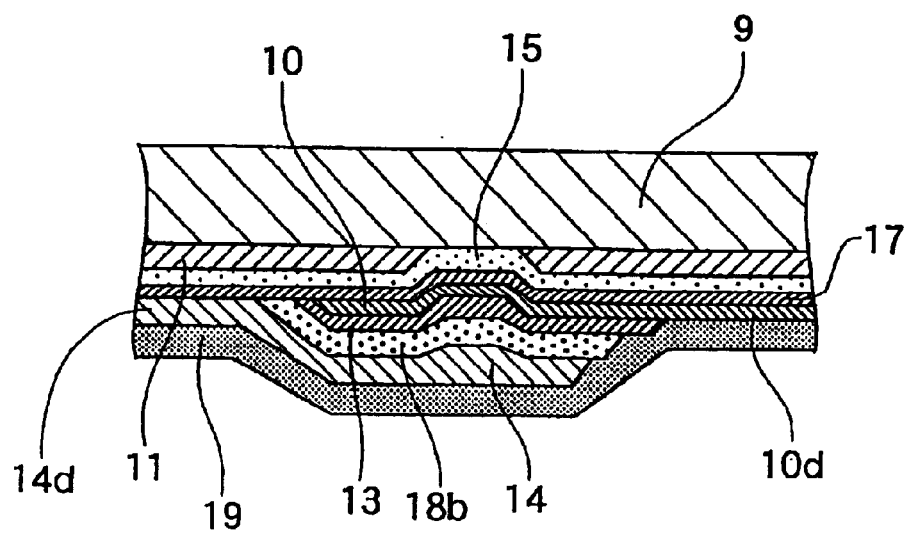
FIG. 12 is an enlarged sectional view showing an essential portion of a member for a push-button switch according to a second embodiment of the present invention having the structure shown in FIG. 3.
Figure 16:
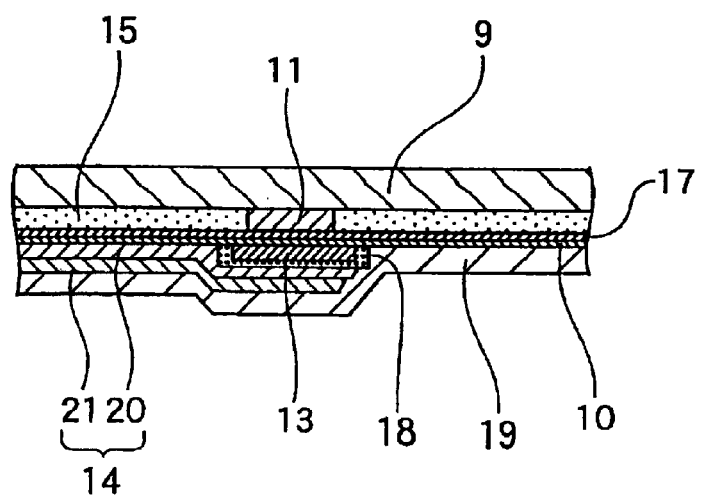
FIG. 16 is an enlarged sectional view showing a structure, in more detail, of the base electrode in a design like the display section shown in FIG. 11.

FIG. 16 is an enlarged sectional view concretely showing a structure of the base electrode 14 in a design of the display section 2 that is substantially similar to the design shown in FIG. 12.

As shown in FIG. 16, the base electrode 14 is formed from a composite conductive layer that is composed of a conductive polymer layer 20 and a conductive filler layer 21 having an organic polymer and a conductive filler. In this structure, even if the chain of the conductive filler is broken, the conductivity can be maintained by additionally disposing the conductive polymer layer 20, thereby being further preferred.

Concerning the thickness of the base electrode 14 and the conductive member 14d extending therefrom, it is desirable to have a thin film thickness, after the molding, of more than three times, and more preferably, of more than five times, the dimension of the conductive filler. According to the flowing and deformation of the binder, it is also necessary for the conductive filler to be movable, and it will be desired for the conductive filler to have a spherical particle shape or like.

In order to ensure the particle chain, a fiber-like filler or a flat plate-like filler may be further selected in which the fiber-like filler is orientated in accordance with the flow and hence easily maintains resistance, which causes the fiber-like filler to be quite convenient. It is desired for the fiber-like conductive filler to have an aspect ratio of more than 10, preferably, more than 20, and more preferably, more than 50, and it is also desired for the fiber-like conductive filter to have a length of less than 0.1 mm in consideration of the printing performance. There is provided, as such a fiber-like filler, one that is formed by tearing a carbon fiber of the polyacrylnitorile group, or one that is formed by effecting a carbon coat or a silver plating to a ceramics whisker such as zinc oxide or potassium titanate. In these materials, a soft one is desirable, and these materials may be formed by effecting silver plating to a synthetic fiber such as acryl, rayon, polyester, phenol or the like, or a single-wall nano-tube or multi-wall nano-tube, in which the nano-tube is a conductive fiber having a diameter of less than 0.2 $\mu$m, and thus is very convenient. The compounding amount is determined on the basis of a desired resistance, which is 0.1 to 20% by weight.

Third Embodiment of the Present Invention

Figure 17:
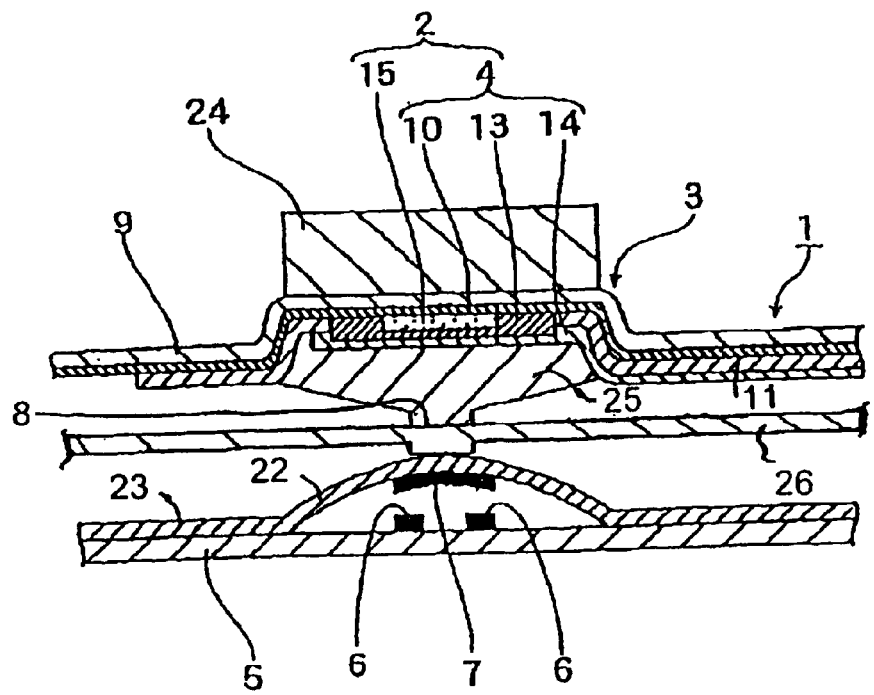
FIG. 17 is a sectional view showing an essential portion of a member for a push-button switch according to a third embodiment of the present invention.
Figure 18:
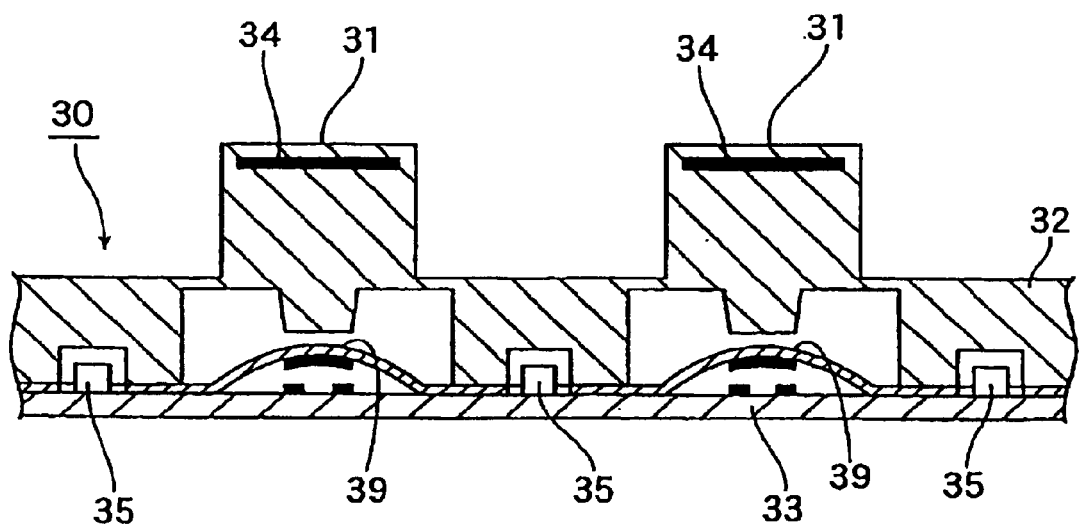
FIG. 18 is a sectional view of an essential portion of a push-button switch member utilizing an LED as a light source according to a conventional structure.
Figure 19:
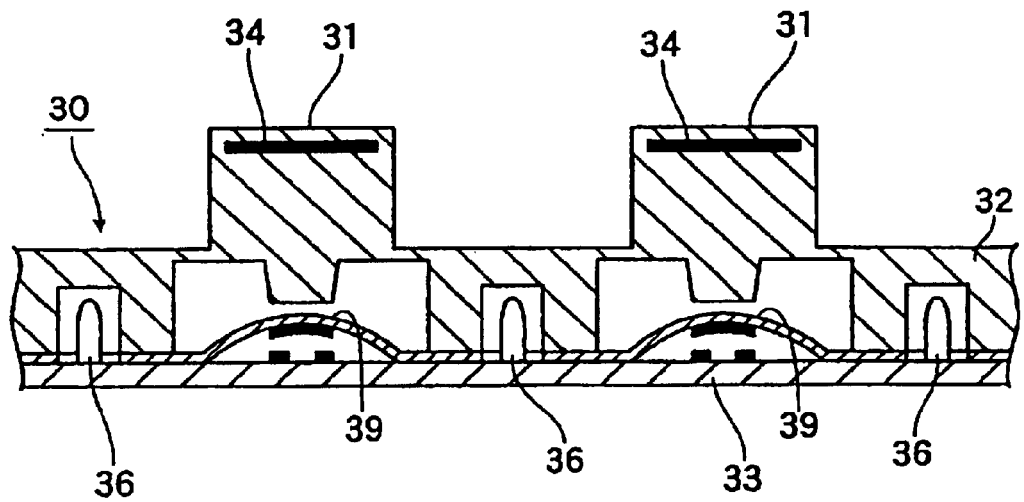
FIG. 19 is a sectional view of an essential portion of a push-button switch member utilizing a bulb as a light source according to a conventional structure.
Figure 20:
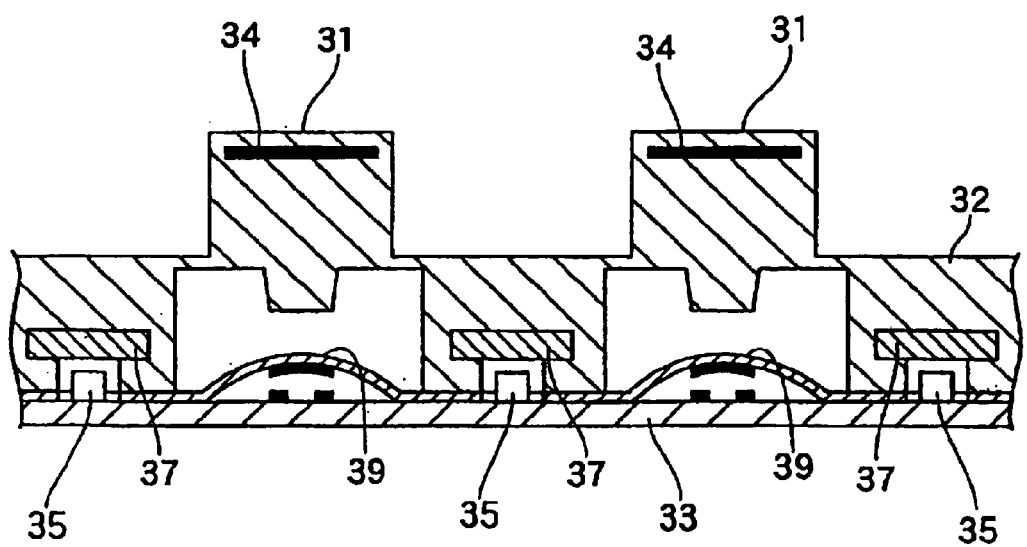
FIG. 20 is a sectional view of an essential portion of a push-button switch member utilizing a conventional light guide member.
Figure 21:
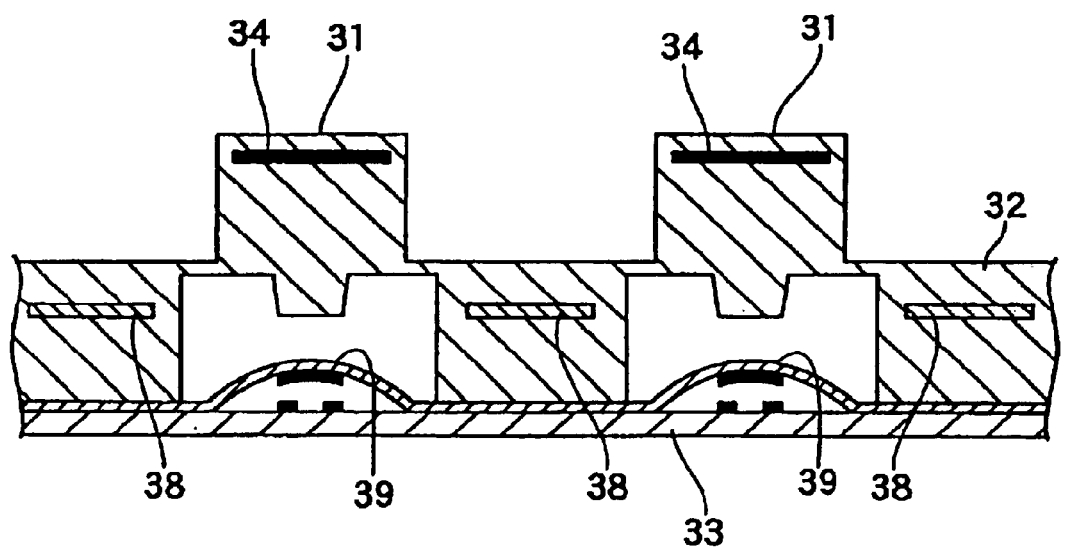
FIG. 21 is a sectional view of an essential portion of a push-button switch member utilizing an EL sheet as a conventional light source.

FIG. 17 represents a push-button switch member according to the third embodiment of the present invention.

The push-button switch member 1 of the third embodiment of the present invention shown in FIG. 17 is provided with the display section 2 for displaying a letter, symbol or figure which is arranged at the intermediate portion of the key-top portion 3 and which adopts the area emitter 4 of self-emitting type.

The push-button switch member 1 according to the third embodiment 3 comprises a contact point sheet 23 and a key-top portion 3 that is formed integrally therewith. The contact point sheet 23 has an elastically deformable dome portion 22 having an inner surface to which a movable contact point 7 is arranged at a portion corresponding to a stationary contact point 6 that is formed on the circuit board 5 in positional conformity therewith. The key-top portion 3 is provided with a push projection 8 that is formed to the rear surface of the key-top portion 3 so as to press the central portion of the dome portion 22 of the contact point sheet 23.

Further, a cover base member 26 which is formed of an elastic material such as silicone is disposed between the push-button switch member 1 and the circuit board 5 so as to cover an outer periphery of a plurality of key-top portions 3 which are disposed at predetermined positions. When the key-top portion 3 is depressed, a portion of the cover base member 26 is elastically deformed towards the circuit board 5 side. On the other hand, when a hand (finger) of an operator is released from the key-top portion 3, the cover base member 26 is returned to its original position due to an elastic restoring force of the cover base member 26.

On the surface of the transparent insulating film 9, there is integrally provided a first resin mold product 24 having a desired key-top shape, and the transparent electrode 10 is disposed to the rear surface side of the transparent insulating film 9.

On the rear surface of the transparent electrode 10, there is formed a transparent color layer 15 having a portion corresponding to the top surface portion of the key-top portion 3 to which the pattern of the display section 2 is formed with a transparent coloring ink. The display section 2 is formed at one portion of the top surface of the key-top portion 3, and the light emitting layer 13 which is composed of a light emitting substance is disposed to the rear surface of the transparent color layer 15 and the rear surface of the transparent electrode 10 surrounding the transparent color layer 15. Furthermore, the base electrode 14 which is composed of a silver paste is formed to the rear surface of the light emitting layer 13. A second resin mold product 25, which is provided with the press projection 8 at a portion corresponding to the central portion of the rear surface of the key-top portion 3, is integrally formed to the rear surface of the base electrode 14.

Further, it is to be noted that the substance of the respective elements or portions of the third embodiment are substantially the same as those of the first embodiment.

A manufacturing method of the push-button switch member 1 according to this third embodiment will now be described.

First, the belt-shaped transparent electrode 10, having a width substantially equal to a width of the top surface portion of the key-top portion 3, is formed at a portion at which the key-top portion 3 of the rear surface of the transparent insulating film 9 is positioned, and the pattern portion of the display section 2 is formed with the transparent coloring ink on the transparent electrode 10. Then, the light emitting layer 13 is formed by coating the emitting substance on the transparent electrode 10 and the display section 2 on the rear surface side of the key-top portion 3. Next, the opaque color layer 11 is formed by coating the light shielding and the insulating ink on the outer peripheral portion of the light emitting layer 13 and on the transparent electrode 10 except for the portion corresponding to the rear surface central portion of the key-top portion 3. The base electrode 14, as an opposing electrode, is printed on the light emitting layer 13 so as to be within a printing area of the opaque color layer 11. The second resin mold product 25 is formed on the base electrode 14, and the push projection 8 is also formed integrally to the rear surface central portion thereof.

In the next step, the first resin mold product 24, which is preliminarily formed so as to provide a desired key-top shape, is bonded and fixed to the front surface side of a position corresponding to the transparent insulating film 9, to which the second resin mold product 25 is formed, to thereby complete the push-button switch member 1 of the third embodiment.

In the third embodiment, the light emitting layer 13 is disposed between the first resin mold product 24 and the second resin mold product 25 at an intermediate position of the key-top portion 3. Accordingly, since the light emitting layer 13 is disposed in an environmental condition that is isolated from an external atmosphere, there is less influence by water or oxygen, and hence, the luminescence cannot be deteriorated even in a long term use.

Further, in the first and second embodiments, the display section 2 is positioned to the top surface portion of the key-top portion 3. On the other hand, in the third embodiment, the display section 2 is positioned to the intermediate position of the key-top portion 3. However, the locating position of the display section 2 is not limited so long as the display portion 2 is integrally formed with the top surface portion, the rear surface portion or the intermediate portion of the key-top portion 3, whereby it will be decided to be in accordance with desirable design.

Furthermore, in general, the display section 2 is positioned at an upper position of the key-top portion 3 because the transparent electrode 10 is positioned above the transparent insulating film 9. However, as the light emitting layer 13 is influenced in its usable life period by water or oxygen, the invasion of the water or oxygen from the upper or lower portion is made evenly by integrally molding by bonding agent or with an inmold, a mold product composed of the transparent insulating resin on the transparent insulating film 9, to which the display section 2 has been printed and coated, after the molding thereof and forming the display section 2 at the central portion of the key-top portion 3, which is an effective countermeasure for the long time use.

In the case where the inorganic EL sheet is used as a conventional flat light source, the inorganic EL sheet needs a wide area, and in the push-button switch member according to the present invention, the light emitting layer is provided only for the display section of the key-top portion so that the necessary area is made smaller than the necessary area in the conventional inorganic EL sheet to a size of about ⅕ to ¹⁄₁₀₀ of the conventional one, thereby remarkably reducing the power consumption proportionally.

EXAMPLES

Examples 1 to 5 which are prepared for evaluation of the first through third embodiments mentioned above and Comparative Examples 1 and 2 which are prepared in comparison with the Examples 1 to 5 will be explained below.

Preliminary Test

A preliminary test will be explained below which was carried out to confirm the performance of a printed sheet before molding of the push-button switch member 1 according to the present invention.

(Preparation of Thermoplastic Binder)

Thermoplastic polyesters (Manufactured by TOYO-BO, Commercial Name: Byron) having a storage modulus, at 100° C., of 1×10E6 (Pa) and 5×10E8 (Pa) were dissolved into Cellosolve acetate so as to have a solid content of 50 wt %, respectively, to thereby prepare insulating binder solutions (the former being denominated as IL and the latter being denominated as IH).

(Preparation of Silver Paste)

Silver pastes were prepared by mixing, with the IL, desired amounts of a particular silver powder of an average particle diameter of 2.5 μm and 0.3 μm (Manufactured by FUKUDA KINZOKU-HAKUFUN KOGYO K.K., Commercial Name: Silcoat; and Manufactured by D.M.C. Square, Commercial Name; Silver Powder) so as to provide a volume resistance of 1×10E-3 to 5×10E-2 (denominated as ILSL and ILSS, respectively). With respect to the IH, in the same manner, the silver pastes IHSL and IHSS were obtained.

(Tension Testing)

Ten kinds of test specimens were prepared by using the four kinds of silver pastes prepared in the above-described manner, and these silver pastes were printed on amorphous polyethylene terephthalate sheets each having a thickness of 50 μm and then dried. Thereafter, an insulating binder solution was further coated to cover the same with a film having a thickness of 10 μm. The thus obtained printed materials were punched out each in a shape of a dumbbell having a neck width of 2 mm, and in an atmosphere of 100° C., tension testing was performed at pulling speed of 100 mm/min., and resistance and elongation were measured at 200% elongation optionally. After the testing, the film thicknesses of the silver pastes on the test piece were measured.

Test results with respect to these ten kinds of specimens are shown in the following Tables 1 and 2.

TABLE 1

| Specimen No. | 1 | 2 | 3 | 4 | 5 |
|---|---|---|---|---|---|
| Kind of Silver Paste | ILSS | ILSL | IHSS | IHSL | ILSS |
| Initial Film Thickness(μm) | 10 | 25 | 10 | 25 | 10 |
| Film Thickness after Elongation(μm) | 3 | 9 | 3 | 9 | 3 |
| Kind of Coat Material | IH | IH | IL | IL | Non |
| Initial Resistance(R0)(Ω) | 2.3 | 0.7 | 2.3 | 0.8 | 2.1 |
| Resistance after Elongation(R)(Ω) | 193 | 72 | 252 | 161 | 4225 |
| R/R0 | 84 | 103 | 110 | 201 | 2012 |

TABLE 2

| Specimen No. | 6 | 7 | 8 | 9 | 10 |
|---|---|---|---|---|---|
| Kind of Silver Paste | IHSL | ILSS | ILSL | ILSS | ILSL |
| Initial Film Thickness (μm) | 25 | 2 | 10 | 5 | 10 |
| Film Thickness after Elongation(μm) | 9 | 0.8 | 3 | 2 | 3 |
| Kind of Coat Material | Non | IH | IH | Non | Non |
| Initial Resistance(R0)(Ω) | 0.7 | 5.7 | 2.1 | 5.5 | 2.1 |
| Resistance after Elongation(R)(Ω) | 2621 | 349142 | 930027 | Over | Over |
| R/R0 | 3744 | 61253 | 44287 | ∞ | ∞ |

According to these test results, the specimens 5 and 6 having no insulation coat showed a large increase in resistance after the tension testing in comparison with the specimens having the insulation coat. In addition, the specimens 7 and 8 having a film thickness, after the tension testing, of less than three times the size of the conductive particle showed a remarkable increase in resistance.

Example 1

This Example 1 corresponds to the first embodiment of the present invention.

First, a transparent treating solution was obtained by dispersing a multi-wall nano-tube (wire diameter of 0.01 μm, average wire length of 5 μm, manufactured by Hyperion Catalysis International) of 3% with respect to a solid component of a solution of poly (3,4-ethylene dioxythiophen) (Denatron 4001, manufactured by NAGASE SANGYOU K.K.) that was obtained by doping sulfonated polystyrene by using a homogenizer into the foregoing solution. Next, the treating solution was coated on the entire surface of the one surface of the transparent insulating film 9 (polymethyl methacrylate (Acryplen, manufactured by MITSUBISHI Rayon) having thickness of 100 μm) by using a gravure coater to thereby form the transparent electrode 10 having a thickness of 1 μm, which has a full light transmittance of 70% (measured in accordance with JIS-K7105) and a surface resistance of 500 Ω/□ (measured in accordance with JIS-K6911).

The opaque color layer 11 was coated with a black color ink having a shielding performance and an insulating performance, and the base portion of the display section 2 was coated entirely through the screen printing except for the pattern portion of the display section 2 and the second electrode terminal portion. The light emitting layer 13 having a thickness of 20 μm was formed to the punched-out portion 12 of the base portion by printing the inorganic EL paste that was prepared by dispersing zinc sulfide having a green luminescent color into cyanoethylcellulose, and the exciting reflection layer, which has barium titanate powder dispersed in cyanoethylcellulose, having a thickness of 10 μm was formed. Finally, the opposing electrode was disposed on the light emitting layer 13, and the terminal electrode that is connected thereto was disposed to the opaque color layer 11 by means of base electrode 14 (Dohdent NH-030A, Thermoplastic polyamide binder, manufactured by NIHON HANDA K.K.). After the printing process, it was adequately dried by a vacuum dryer to thereby obtain a printed film.

By using a mold having twelve cavities each having a diameter of 12 mm, a depth of 7.8 mm and a bottom surface of R50 (mm), and a first male mold framed thereby and formed from an elastic material having hardness of 900 (shore A), a metal piece having a diameter of 8 mm was placed, for heat insulation, at the pattern portion of the display section 2, the metal piece was then heated to 110° C. by utilizing infrared rays, and the metal piece was removed. Immediately thereafter, the printed film was subjected to cold compression molding. After the removal of the male mold, a necessary amount of liquid silicone rubber (hardness of 80° shore A) was poured into a mold as a key-top body 16, and by utilizing a second male mold having a sectional shape shown in FIG. 1, the press projection B was formed to the rear surface portion of the key-top body 16. The movable contact point 7 was formed to this pressing projection 8 by silicone ink containing carbon black, thereby obtaining the push-button switch member 1 (corresponding to the first embodiment).

The electrode terminal of the push-button switch member 1 and the electrode terminal on the circuit board 5 were rested in a mated state, and an alternating current of 50V and 100 Hz was applied to the light emitting layer 13. In this moment, all of the display sections 2 emitted green color with a luminance of 5.2 nit.

Comparative Example 1

Comparative Example 1 was prepared for the evaluation of the first embodiment.

The Comparative Example 1 is substantially the same as the Example 1 except that the transparent electrode 10 was formed from ITO ink (Manufactured by SUMITOMO OSAKA Cement K.K.) (no nano-tube) in which transparent ceramics particles were dispersed.

When the push-button switch member according to this Comparative Example 1 was lighted, the switch member was not lighted at five points, and the remaining points were lightened with uneven luminance and it was difficult to regard the state of lighting.

Example 2

This Example 2 corresponds to the first embodiment of the present invention.

In this Example 2, the transparent electrode 10 was prepared similar to Example 1 by coloring a conductive polymer with red. The light emitting layer 13 was composed of zinc sulfide having a white color.

First, a transparent red-color treating solution was obtained by adding a multi-wall nano-tube (wire diameter of 0.01 μm, average wire length of 5 μm, manufactured by Hyperion Catalysis International) of 3% with respect to a solid component of a solution of poly (3,4-ethylene dioxythiophen)(Denatron 4001, manufactured by NAGASE SANGYOU K.K.) that was obtained by doping sulfonated polystyrene, and a dye that was composed of azo compound of 0.1 wt % with respect to the solid component of the foregoing solution and dispersing it by using a homogenizer into the foregoing solution. Next, the treating solution was coated entirely on the one surface of the transparent insulating film 9 (polymethyl methacrylate (Acryplen, manufactured by MITSUBISHI Rayon) having thickness of 100 μ) by using a gravure coater to thereby form the red color transparent electrode 10 having a thickness of 1 μm. Furthermore, the non-colored conductive polymer solution as mentioned above was coated on the periphery of the pattern section of the display section 2 through the screen printing.

Substantially the same treatment as the one carried out for the Example 1 was effected thereafter to thereby obtain the push-button switch member 1.

The electrode terminal of the push-button switch member 1 and the electrode terminal on the circuit board 5 were rested in a mated state, and an alternating current of 50V and 100 Hz was applied to the light emitting layer 13. In this moment, all of the display sections 2 emitted with a luminance of 6.0 nit.

Example 3

This Example 3 corresponds to the second embodiment of the present invention.

First, a transparent treating solution was obtained by dispersing a multi-wall nano-tube (wire diameter of 0.01 μm, average wire length of 5 μm, manufactured by Hyperion Catalysis International) of 3% with respect to a solid component of a solution of poly (3,4-ethylene dioxythiophen) (Denatron 4001, manufactured by NAGASE SANGYOU K.K.) that was obtained by doping sulfonated polystyrene by using a homogenizer into the foregoing solution. Next, the treating solution was coated entirely on one surface of the transparent insulating film 9 (polymethyl methacrylate (Acryplen, manufactured by MITSUBISHI Rayon) having thickness of 100 μm) by using a gravure coater to thereby form the transparent electrode 10 having a thickness of 1 μm, which has a full light transmittance of 70% (measured in accordance with JIS-K7105) and a surface resistance of 500 Ω/□ (measured in accordance with JIS-K6911).

The opaque color layer 11 was coated with a black color ink having a shielding performance and an insulating performance, and the base portion of the display section 2 was coated entirely through the screen printing except for the display section 2 and the second electrode terminal portion. The light emitting layer 13 having a thickness of 20 μm was minimally formed to the opened portion of the base portion by printing the inorganic EL paste that was prepared by dispersing zinc sulfide having a green luminescent color into cyanoethylcellulose, and the dielectric layer 18b which has barium titanate powder dispersed in cyanoethylcellulose, having a thickness of 10 μm was formed. Finally, the base electrode 14 was formed on the dielectric layer 18b with silver paste (ILSS), and the terminal electrode composed of the conductive member 14d that is continuous thereto was formed on the opaque color layer 11. A printing process was then performed so as to cover the base electrode 14 and its conductive member 14d by using the above-mentioned thermoplastic binder (IH). After the printing process, it was adequately dried by a vacuum drier to thereby obtain a printed film.

By using a mold having twelve cavities each having a diameter of 12 mm, a depth of 78 mm and a concave bottom surface of R50 (mm), and a first male mold framed thereby and formed from an elastic material having hardness of 90° (shore A), a metal piece having a diameter of 8 mm was placed, for heat insulation, to the display section 2, the metal piece was then heated to 110° C. by utilizing infrared rays, and the metal piece was removed. Immediately thereafter, the printed film was subjected to cold compression molding. After the removal of the male mold, a necessary amount of liquid silicone rubber (hardness of 80° shore A) was poured into a mold as a key-top body 16, and by utilizing a second male mold having a sectional shape shown in FIG. 1, the projecting portion was formed to a core portion. A contact point was formed to this projecting portion by a silicone ink containing carbon black, thereby obtaining the push-button switch member 1 having a plurality of key-top portions 3.

The electrode terminal of the push-button switch member 1 and the electrode terminal on the printed circuit board were rested in a mated state, and an alternating current of 50V and 100 Hz was applied to the light emitting layer 13. In this moment, all of the display sections 2 of the plural key-top portions 3 emitted a green color with a luminance of 6.2 nit having a sufficient brightness.

Example 4

This Example 4 corresponds, similar to Example 3, to the second embodiment of the present invention.

In this Example 4, the transparent electrode 10 was prepared similar to Example 3 by coloring a conductive polymer with red. The light emitting layer 13 was composed of a zinc sulfide having a white color.

First, a transparent red-color treating solution was obtained by adding a multi-wall nano-tube (wire diameter of 0.01 μm, average wire length of 5 μm, manufactured by Hyperion Catalysis International) of 3% with respect to a solid component of a solution of poly (3,4-ethylene dioxytiophen) (Denatron 4001, manufactured by NAGASE SANGYOU K.K.) that was obtained by doping sulfonated polystyrene and dye composed of azo compound of 0.1 wt % with respect to the solid component of the foregoing solution and dispersing it by using a homogenizer into the foregoing solution. Next, the treating solution was coated entirely on the one surface of the transparent insulating film 9 (polymethyl methacrylate (Acryplen, manufactured by MITSUBISHI Rayon) having thickness of 100 μm) by using a gravure coater to thereby form the red color transparent electrode 10 having a thickness of 1 μm. Furthermore, the non-colored conductive polymer solution as mentioned above was coated on the periphery of a design pattern through the screen printing. Thereafter, treatment was effected to the dielectric layer 18b similar to the Example 1. Then, the base electrode 14 was prepared, similar to the transparent electrode 10, with a conductive ink which has 20% of multi-wall nano-tube dispersed in the conductive polymer, and a silver paste (ILSL) was then printed so as to provide a thickness of 10 μm. Thereafter, similar to Example 2, a push-button switch member 1 having a plurality of key-top portions was obtained.

The electrode terminal of the push-button switch member 1 and the electrode terminal on the printed circuit board were rested in a mated state, and an alternating current of 50V and 100 Hz was applied to the light emitting layer 13. In this moment, the display sections 2 of the plural key-top portions 3 entirely emitted with a luminance of 7.0 nit, thereby providing sufficient brightness.

Example 5

This Example 5 corresponds to the third embodiment of the present invention.

In this Example 5, the transparent insulating film 9 was prepared by laminating ethylene-vinyl-alcohol copolymer films having a thickness of 15 µm to both plasma treated surfaces of a polypropylene film having a thickness of 100 µm. The base portion of the display section 2, except for the pattern portion, was entirely coated with a green opaque color ink through screen printing. On the thus coated display section 2, the pattern portion of the display section 2 and the terminal electrode that is connected thereto were formed through the ink jet printing by using a solution having polyaniline and a sulfonated dendorimer dopant (a dopant obtained by reacting benzensulfonic acid with dendorimer (DAB(PA)8) which is derived from diaminobutane (manufactured by DSM Firm) and cyanoethylene) of 1/6 mol of a structural unit of polyaniline. Moreover, a conductive polymer ink, which was obtained by being mixed with silver powder (Silcoat, manufactured by FUKUDA KINZOKU-HAKUFUN KOGYO K.K.) of 75 wt % solid component of polyaniline solution, was printed as a formed layer having a thickness of 5 µm so as to cover the polyaniline from the periphery of the pattern portion of the display section 2 to the terminal portion. The transparent electrode 10 provided a full light transmittance of 65% (measured in accordance with JIS-K7105) and a surface resistance of 700 Ω/□ (measured in accordance with JIS-K6911).

The light emitting layer 13 having a thickness of 15 µm was then formed so as to cover the transparent electrode 10 through the ink jet printing by using ink for LEC having poly (p-phenylene-2, 6-benzoimidazol), polyethylene oxide and lithium toluene-sulfonate. Then, the base electrode 14 of the light emitting layer 13 and the terminal electrode that is connected thereto were formed, from a silver mixed conductive polymer ink, apart from the above-mentioned formed layer. After the printing process, it was adequately dried by a vacuum dryer to thereby obtain a printed film.

By using a female mold having fifteen cavities each having a size of 3 mm×5 mm and a depth of 1.5 mm of a recessed flat bottom surface portion, and a male mold having a size of 2.8 mm×4.8 mm and a height of 0.9 mm of a flat protruded top surface portion, a metal piece having a size of 2.6 mm×4.6 mm, for heat insulation, was placed on the pattern portion of the display section 2, the metal piece was then heated at 100° C. by utilizing infrared rays, and then, the metal piece was removed. Immediately thereafter, the printed film was subjected to cold compression molding. After the removal of the male mold, a necessary amount of liquid state epoxy resin containing an iron component of 10 wt % as an oxygen removing agent was poured, and by using the second male mold having the same sectional area as the sectional area shown in FIG. 11, the second resin molded form 20 and the push projection 8 on its rear surface central portion were formed.

Furthermore, a first resin molded form 19, having a desired key-top shape, formed from acrylic resin, was bonded with two component acrylic adhesives. An electrode portion of the thus obtained molded form was masked and dipped in a silanol solution with a catalyst of aminosilanol. Then, it was dried at a temperature of 40° C. and reacted to thereby form a silica layer, having thickness of 2 µm, on the surface of the molded form, thereby obtaining a uniform push-button switch member 1 (corresponding to the second embodiment).

The electrode terminal of the push-button switch member 1 and the electrode terminal on the circuit board 5 were rested in a mated state, and a direct current of 4V was applied to the light emitting layer 13. In this moment, the display sections 2 entirely emitted with a luminance of 6.5 nit.

Comparative Example

The Comparative Example 2 was prepared for the evaluation of the Example 5.

The Comparative Example 2 was prepared by substantially the same manner as the Example 3 except that the transparent electrode 10 was formed through ion spattering of an indium tin oxide.

When the push-button switch member according to the Comparative Example 2 was lighted, it was not lighted at all.

Possibility of Industrial Usage

This invention is effectively utilized for a back-light type push-button switch member which is capable of lighting up a display section even in a dark place for push-button switch members each having a display section for displaying a switching function in an input device such as a cellular phone (portable phone), a portable terminal such as a PDA (personal digital assistant), a car-stereo, a board computer which is mounted to vehicle, an audio-set, a measurement instrument, a personal computer, etc.

What is claimed is:

1. A push-button switch member comprising:
   a key-top portion for pressing a movable contact point which is disposed against a stationary contact point on a circuit board so as to oppose the stationary contact point; and
   a cover base member provided with said key-top portion at a predetermined portion of said key-top portion and adapted to be mounted to the circuit board;
   wherein said key-top portion comprises
      a display section operable to display a switching function,
      a base electrode,
      a transparent electrode disposed so as to oppose said base electrode and to contact with said display section, said transparent electrode being continuously and integrally formed in a range including and between a side surface and an upper surface of said key-top portion, and said transparent electrode comprising a transparent conductive polymer which is selected from the group consisting of a derivative of polypyrrole, a derivative of polythiophene and a derivative of polyaniline, and
      an area emitter member integrally formed with said display section, said area emitter comprising a light emitting layer which is disposed between said base electrode and said transparent electrode.

2. The push-button switch member according to claim 1, wherein said transparent electrode has a surface resistance of not less than 10 Ω/□ and a light transmittance of not more than 90%.

3. The push-button switch member according to claim 1, wherein said transparent electrode comprises an electroconductive fiber having a diameter of not more than 0.5 µm and an aspect ratio of not less than 20.

4. The push-button switch member according to claim 1, wherein said transparent electrode is colored.

5. The push-button switch member according to claim 1, wherein elongatable conductive members are connected to said base electrode and said transparent electrode, respectively, and said elongatable conductive members having elongating portions to which a tensile force is applied at a molding process are covered with elongatable insulating thin films, respectively.

6. The push-button switch member according to claim 5, wherein said elongatable conductive members connected respectively to said base electrode and said transparent electrode are arranged so as to not overlap each other.

7. The push-button switch member according to claim 5, wherein each of said insulating thin films has a storage modulus, at a molding temperature thereof, which is larger than a storage modulus of said elongatable conductive members connected to said base electrode and said transparent electrode at a molding temperature thereof.

8. The push-button switch member according to claim 5, wherein said base electrode and said elongatable conductive member connected to said base electrode are comprised of a conductive layer containing an organic polymer and a conductive filler, and said filler has a side length of not more than ⅓ of thickness of said elongatable conductive layer.

9. The push-button switch according to claim 8, wherein a conductive layer has said conductive polymer layer.

10. The push-button switch member according to claim 8, wherein said conductive filler is composed of a fiber material having a diameter of not more than 1 $\mu$m.

11. The push-button switch member according to claim 5, wherein said base electrode and said elongatable conductive member connected to said base electrode are formed of a conductive polymer.

12. The push-button switch member according to claim 1, wherein said key-top portion includes a key-top body in the shape of a key-top formed to a rear surface of said base electrode, and a push projection is formed to a rear surface of said key-top body for contacting a movable electrode at the movable contact point to a stationary electrode at the stationary contact point on the circuit board.

13. The push-button switch member according to claim 1, wherein said key-top portion has a transparent first resin molded form having a key-top shape to the surface of said transparent electrode through a transparent insulating film, and a second resin molded form formed with a push projection to a rear surface of said base electrode for contacting a movable electrode at the movable contact point to a stationary electrode at the stationary contact point on the circuit board.

14. The push-button switch member according to claim 1, wherein a plurality of switch circuits composed of a plurality of said key-top portions and a plurality of said base electrodes and a plurality of said transparent electrodes corresponding to said plurality of key-top portions, respectively, are integrally formed to said cover base member.

15. A push-button switch member comprising a key-top portion for pressing a movable contact point which is disposed against a stationary contact point on a circuit board so as to oppose the stationary contact point, wherein said key-top portion comprises:
a display section operable to display a switching function,
a base electrode,
a transparent electrode disposed so as to oppose said base electrode and to contact with said display section, said transparent electrode being continuously and integrally formed in a range including and between a side surface and an upper surface of said key-top portion, and said transparent electrode comprising a transparent conductive polymer which is selected from the group consisting of a derivative of polypyrrole, a derivative of polythiophene and a derivative of polyaniline, and
an area emitter member integrally formed with said display section, said area emitter comprising a light emitting layer which is disposed between said base electrode and said transparent electrode.

16. The push-button switch member according to claim 15, wherein said transparent electrode has a surface resistance of not less than 10 $\Omega/\square$ and a light transmittance of not more than 90%.

17. The push-button switch member according to claim 15, wherein said transparent electrode comprises an electroconductive fiber having a diameter of not more than 0.5 $\mu$m and an aspect ratio of not less than 20.

18. The push-button switch member according to claim 15, wherein said transparent electrode is colored.

19. The push-button switch member according to claim 15, wherein elongatable conductive members are connected to said base electrode and said transparent electrode, respectively, and said elongatable conductive members having elongating portions to which a tensile force is applied at a molding process are covered with elongatable insulating thin films, respectively.

20. The push-button switch member according to claim 19, wherein said elongatable conductive members connected respectively to said base electrode and said transparent electrode are arranged so as to not overlap each other.

21. The push-button switch member according to claim 19, wherein each of said insulating thin films has a storage modulus, at a molding temperature thereof, which is larger than a storage modulus of said elongatable conductive members connected to said base electrode and said transparent electrode at a molding temperature thereof.

22. The push-button switch member according to claim 19, wherein said base electrode and said elongatable conductive member connected to said base electrode are comprised of a conductive layer containing an organic polymer and a conductive filler, and said filler has a side length of not more than ⅓ of thickness of said elongatable conductive layer.

23. The push-button switch according to claim 22, wherein a conductive layer has the conductive polymer layer.

24. The push-button switch member according to claim 22, wherein said conductive filler is composed of a fiber material having a diameter of not more than 1 $\mu$m.

25. The push-button switch member according to claim 19, wherein said base electrode and said elongatable conductive member connected to said base electrode are formed of a conductive polymer.

26. The push-button switch member according to claim 15, wherein said key-top portion includes a key-top body in the shape of a key-top formed to a rear surface of said base electrode, and a push projection is formed to a rear surface of said key-top body for contacting a movable electrode at the movable contact point to a stationary electrode at the stationary contact point on the circuit board.

27. The push-button switch member according to claim 15, wherein said key-top portion has a transport first resin molded form having a key-top shape to the surface of said transparent electrode through a transparent insulating film, and a second resin molded form formed with a push projection to a rear surface of said base electrode for contacting a movable electrode at the movable contact point to a stationary electrode at the stationary contact point on the circuit board.

\* \* \* \* \*